(12) United States Patent
Vazquez et al.

(10) Patent No.: US 7,051,317 B2
(45) Date of Patent: May 23, 2006

(54) SYSTEM AND METHOD FOR SPECIFYING A COMPUTER-IMPLEMENTED PROCESS USING DIFFERENT PROGRAMMING METHODOLOGIES

(75) Inventors: Nicolas Vazquez, Austin, TX (US); Kevin L. Schultz, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 620 days.

(21) Appl. No.: 09/940,189

(22) Filed: Aug. 27, 2001

(65) Prior Publication Data

US 2003/0038841 A1    Feb. 27, 2003

Related U.S. Application Data

(60) Provisional application No. 60/301,799, filed on Jun. 29, 2001.

(51) Int. Cl.
*G06F 9/44* (2006.01)

(52) U.S. Cl. .................................. 717/104; 717/123

(58) Field of Classification Search ............... 717/123, 717/101–109, 115; 348/346; 700/83, 259, 700/264

See application file for complete search history.

(56) References Cited

U.S. PATENT DOCUMENTS

| | | | |
|---|---|---|---|
| 5,473,749 A * | 12/1995 | Ito et al. ...................... | 345/505 |
| 5,481,712 A | 1/1996 | Silver et al. | |
| 5,623,659 A | 4/1997 | Shi et al. ........................ | 707/8 |
| 5,631,974 A | 5/1997 | Lau-Kee et al. ............. | 382/132 |
| 5,742,504 A * | 4/1998 | Meyer et al. ................. | 700/83 |
| 5,862,372 A | 1/1999 | Morris et al. ............... | 717/109 |
| 5,911,070 A | 6/1999 | Solton et al. | |
| 5,940,296 A * | 8/1999 | Meyer .......................... | 700/83 |

(Continued)

OTHER PUBLICATIONS

Microsoft Press Computer Dictionary, Third Edition, p. 422. 1997.*

(Continued)

*Primary Examiner*—Wei Y. Zhen
*Assistant Examiner*—Qamrun Nahar
(74) *Attorney, Agent, or Firm*—Meyertons Hood Kivlin Kowert & Goetzel, P.C.; Jeffrey C. Hood; Jason L. Burgess

(57) ABSTRACT

A system and method for specifying a computer-implemented process utilizing two or more different program creation methodologies. In one embodiment, the different program creation methodologies may include specifying steps or operations for the process using graphical input panels, e.g., in a "wizard-based" manner, and using graphical programming techniques for other portions, such as to specify decision operations. Thus, optimum program creation methodologies may be used for specifying different respective portions of the process. At least a portion of the process may be dependent on prior execution results determined by a previous portion of the process. As an example, for a machine vision inspection process, the previous portion of the process may analyze images of a product, and a subsequent portion of the process may depend on the results of the image analysis, e.g., may either accept or reject the product depending on prior execution results of the image analysis portion. Thus, the process may include one or more decision operations that analyze the prior execution results. The execution of the portion(s) of the process that are dependent on prior execution results may depend on the outcome(s) of the decision operation(s). The decision operation(s) may advantageously be specified graphically, e.g., as a block diagram constructed in response to user input.

37 Claims, 22 Drawing Sheets

U.S. PATENT DOCUMENTS

| | | | | |
|---|---|---|---|---|
| 6,061,602 A | * | 5/2000 | Meyer | 700/83 |
| 6,408,429 B1 | * | 6/2002 | Marrion et al. | 717/100 |
| 6,531,707 B1 | * | 3/2003 | Favreau et al. | 250/559.46 |
| 6,684,385 B1 | | 1/2004 | Bailey et al. | |
| 6,701,513 B1 | | 3/2004 | Bailey | |

OTHER PUBLICATIONS

Advanced Imaging, Special Report: Imaging and the Macintosh/Robust Image Databases, Apr. 1991, pp. 18-32.

Optilab Image Processing and Analysis Software for the Apple Macintosh ™ II, User's Manual, dated 1990.

MacUser, John Rizzo, Image Analyst and Enhance, Jul. 1990, pp. 55-58.

SPIE—The International Society for Optical Engineering, Steven Rosenthal and Larry Stahlberg, "Integrated Approach to Machine Vision Application Development", vol. 1386, Nov. 8, 1990, pp. 158-162.

Automatix News Release, www.applefritter.com/macclones/automatix/newsrelease, Vision for Process Feedback and Control, Jul. 3, 2000, pp 1-3.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.

IPLab™, User's Guide, Signal Analytics Corporation, 1991.

MacGuide Magazine, vol. 2, Issue 4, Stuart Gitlow, M.D., "X-Ray Vision," Jun. 1989, pp. 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

IPLab, "Serious Scientific Image Processing for the Macintosh II", 1992 (4 pgs.).

IPLab, "Gives You Unparalleled Value", 1992, (6 pgs.).

Signal Analytics Corp., "IPLab Brings Affordable Scientific Image Processing to the Macintosh II", estimated 1990 (2 pgs.).

Automatix Inc., "A Seminar on Machine Vision & Image Analysis", 1993, (46 pgs.).

National Instruments, Measurement and Automation Catalogue, Interactive Vision Software, 1999, pp. 518-520.

MacUser, "Ultimage and IPLab Spectrum", Jul. 1991, (5 pgs.).

"IMAQ Vision Builder Tutorial," National Instruments, Jan. 1999.

US 6,094,526, 07/2000, Marrion et al. (withdrawn)

* cited by examiner

SYSTEM AND METHOD FOR SPECIFYING A COMPUTER-IMPLEMENTED PROCESS USING DIFFERENT PROGRAMMING METHODOLOGIES

PRIORITY CLAIM

This application claims benefit of priority of U.S. provisional application Ser. No. 60/30 1,799 titled "System and Method for Specifying a Machine Vision Process Using Different Programming Methodologies" filed Jun. 29, 2001, whose inventors are Nicolas Vazquez and Kevin L. Schultz.

FIELD OF THE INVENTION

The present invention relates to the field of graphical programming, and more particularly to a system and method for specifying a computer-implemented process using different programming methodologies, including graphical specification of a decision step for the computer-implemented process.

DESCRIPTION OF THE RELATED ART

Knowledge of computer-implemented techniques for solving problems in a wide array of fields is expanding at a rapid pace. As new techniques and computerized methods are developed for a given problem domain, specialized software applications for developing solutions to problems in that domain are often created. These specialized applications can provide an environment that is conducive to rapidly and conveniently specifying a computer-implemented process. For example, in the field of machine vision software, applications exist for easily specifying a machine vision process by selecting various machine vision steps from a graphical user interface for inclusion in a process.

For many applications, the execution of one or more steps in a process is dependent upon execution results of previously executed steps. Thus, it is often necessary to specify one or more steps for a first portion of a process, wherein these steps compute various values, and to specify one or more decision operations, wherein the decision operations are based on these computed values. The decision operations may compute result values that determine the behavior of subsequent steps in the process.

However, while applications are often streamlined to enable users to easily include steps in a process, the task of defining decision operations in the prior art has been somewhat cumbersome. For example, prior art approaches to defining decision operations have included the use of text-based programming and table and formula editors, including spreadsheets. It would be desirable to enable users to define decision operations at a higher, more intuitive level.

One way to simplify the task of specifying decision operations would be to enable the user to do so graphically. For example, graphical programming environments have become popular, in part, because they enable a user to easily and intuitively implement an algorithm or model a process. U.S. Pat. Nos. 4,901,221; 4,914,568; 5,291,587; 5,301,301; and 5,301,336; among others, to Kodosky et al disclose one embodiment of a graphical programming environment. The graphical programming environment disclosed in Kodosky et al can be considered a higher and more intuitive way in which to interact with a computer. The method disclosed in Kodosky et al allows a user to construct a diagram using a block diagram editor, such that the diagram created graphically displays a procedure or method for accomplishing a certain result, such as manipulating one or more input values to produce one or more output values. In response to the user constructing the diagram, data structures or executable code that corresponds to the displayed procedure may be automatically created, so that the diagram may be compiled or interpreted by a computer. Therefore, desired software behavior may be specified solely by creating a diagram.

SUMMARY OF THE INVENTION

One embodiment of the present invention comprises a system and method for specifying a computer-implemented process utilizing two or more different program creation methodologies. In one embodiment, the different program creation methodologies may include specifying steps or operations for the process using graphical input panels, e.g., in a "wizard-based" manner, and using graphical programming techniques for other portions, such as to specify decision operations. Thus the resulting process may include one or more graphical portions. Thus the present invention may allow for the use of optimum program creation methodologies for different respective portions of the process being specified.

In various embodiments, the method may be employed to specify a process for any purpose or application. For example, the process may interact with or control one or more instruments, e.g., for a machine vision application, image processing application, motion control application, data acquisition and control application, test and measurement application, process control application, simulation application, or other type of application. In some embodiments, the specified process may not interact with external devices or "real world I/O" but may be a purely software process, e.g., a software algorithm.

At least a portion of the process may be dependent on prior execution results determined by a previous or first portion of the process. As an example, for a machine vision inspection process, the first portion of the process may analyze an image of a product, and a subsequent portion of the process may depend on the results of the image analysis, e.g., may either accept or reject the product depending on prior execution results of the image analysis portion. Thus, the process may include one or more decision operations that analyze the prior execution results. The execution of the portion of the process that is dependent on the prior execution results may depend on the outcome of the decision operation. As described below, the decision operation may advantageously be specified graphically, e.g., as a block diagram constructed in response to user input.

The functionality or operation of the process may be specified in part by creating a "process specification." In various embodiments, the process specification may comprise various types of information and may be created in various ways. For example, in one embodiment, the process specification may comprise a "script" or list of steps or operations. The script itself is not a computer program and is not directly executable. However, each step in the script may be associated with executable program instructions. Thus, when the process is desired to be executed, the executable program instructions associated with each step may be executed. For example, a software application that was used to create the script may be operable to determine the steps in the script and invoke the program instructions associated with the steps. When executed, the program instructions associated with the steps in the script may perform a desired function or may compute desired information. For example, the steps may together define an algorithm (or portion of an algorithm). For example, in a machine vision application, the steps may be operable to analyze an image of a product under inspection.

In other embodiments, the process specification may comprise information other than a script such as described above. For example, in one embodiment the process specification may include references to various executable or source code modules, such as C or C++ modules, Java modules, DLLs, shared libraries, graphical programs, or executable or source code packaged in any other standard or proprietary form. In this instance, including a step in the process specification may comprise including a reference to the desired executable or source code in the process specification. The executable or source code associated with the steps may then be executed when the process is desired to be executed.

It is noted that steps in the process specification may be executed sequentially or in various other ways. For example, in one embodiment, the steps may execute in serial order. In another embodiment, the user may specify groups of steps to be executed in parallel. Also, in one embodiment, additional information, such as programming structures, may be included in the process specification which affects the execution of the steps. For example, the user may specify loops among the steps or conditional branching information for various steps. Thus, in some embodiments, the process specification may include more complex program information in addition to references to the steps.

In another embodiment, the process specification may itself be a computer program, e.g., a program entirely or partially constructed using a text-based programming language such as C, C++, Java, Visual Basic, Pascal, FORTRAN, etc. For example, the user may construct a computer program including various function or method calls such that the program is operable to perform a desired function or compute desired information when executed. The process specification may also optionally be stored or represented as a graphical program, e.g., a block diagram.

The process specification may be created in various ways. In one embodiment, the user may use a software application that provides a graphical user interface for selecting various steps or operations, e.g., from a palette or menu, and including them in the script or program. In response to the user selecting various steps or operations, the steps may be recorded in a script, or alternatively program instructions may be referenced or automatically created and included in a computer program. In one embodiment, the user may specify various steps by interactively selecting operations, e.g., from a palette or menu, and interactively applying the operations to an object, such as by selecting image processing operations to apply to an image. For example, a software application may provide specialized support for creating processes of a certain type, e.g., machine vision processes or data acquisition processes. The software application may enable the user to select desired steps or operations from a specialized library or set of steps or operations. For example, an application specialized for specifying machine vision processes may provide a library of various machine vision or image processing operations, such as pattern-matching operations, edge detection operations, etc. One example of a software application specialized for creating scripts for machine vision or image processing applications is the IMAQ Vision Builder application from National Instruments.

The user may also specify steps of a script in any of various other ways, such as by applying operations to or manipulating a physical or simulated system. For example, for a robotics application, the user may control movement of a real or simulated robotic arm, and in response, steps operable to automatically reproduce the movements may be included in the script or program instructions may be automatically created. In a motion control application, the user may control a simulated 2-D or 3-D image of the motion control device, and in response steps or program instructions may be automatically created that accomplish or perform the indicated motion control.

In addition to the process specification, one or more portions of the process may be specified graphically, e.g., as a graphical block diagram or graphical program. The process specification and the graphical block diagram(s) may collectively specify the complete process. For example, as described above, for many processes it is necessary to perform one or more decision operations. A decision operation may be specified graphically in response to user input, wherein the decision operation is based on or utilizes execution results of at least a subset of the operations specified in the process specification.

The graphical portions of the process may be specified in any of various ways. In one embodiment, a diagram, e.g., a block diagram may be created. As used herein, the term "block diagram" may refer to a plurality of interconnected nodes or icons which visually indicate the functionality of the diagram or program, wherein the nodes or icons may be connected in one or more of a data flow, control flow, or execution flow format. The block diagram may include nodes representing result values determined by execution of one or more operations in the process specification. The block diagram may also include various function nodes, e.g., to perform mathematical or other functions on the execution result values. The block diagram nodes may be interconnected, e.g., in one or more of a data flow, control flow, and/or execution flow format, so as to specify a desired decision operation or other functionality. The block diagram may then be analyzed or compiled to create program instructions executable to implement the functionality specified by the block diagram. Alternatively, the block diagram may be interpreted at runtime. In one embodiment, a graphical programming development environment may be used in creating the block diagram. One embodiment of a method for constructing a block diagram to specify a decision operation is described.

In one embodiment, a decision step may be included in the process specification in response to the created graphical block diagram, i.e., the graphically specified decision operation. The decision step may reference the program instructions created for the block diagram, such that when the process is executed, these program instructions are executed to perform the specified decision operation. Thus, executing the program instructions associated with the decision step may compute a result (or results) that is based on execution results of at least a subset of the operations specified in the process specification, i.e., a result that is based on the execution results used in the decision operation. It is noted that in other embodiments, the decision operation may be performed when the process is executed, but an explicit decision step may not be included in the process specification.

In another embodiment, the process specification may be programmatically converted into a graphical program or block diagram that is then connected with the block diagram directly created by the user. Thus the entire process may be converted into a graphical portion or block diagram. Alternatively, the process specification may be stored as a block diagram, and the block diagram representing the process specification may be connected to the block diagram directly created by the user.

The process specification may also include steps or operations that utilize or depend on the result(s) computed by the graphical portion(s) of the process. For example, as described above, it may be necessary or desirable for the process specification to include steps that are dependent on prior execution results determined by a previous portion of the process specification. These dependent steps may be included in the process specification in response to user input. The result(s) computed by the graphical portion may thus be used to control the execution of subsequent (dependent) steps in the process specification. For example, consider a decision operation for a machine vision application that is operable to compute a Pass/Fail inspection result based on parameters returned by image analysis steps in the process specification. In this example, the dependent steps included in the process specification may include: a step operable to remove the product from an assembly line if the result is Fail; a step operable to log a record in a first database table if the result is Pass or a second database table if the result is Fail; etc.

Thus, in one embodiment of defining a computer-implemented process, the following may be created: a first portion of a process specification that includes steps or operations operable to determine one or more execution result values; a graphical portion (e.g., a block diagram) that utilizes the execution result values determined by the first portion of the process specification to compute a result; and a second portion of the process specification that includes steps or operations that depend on the result computed by the graphical portion, i.e., steps or operations operable to perform different functionality depending on the result of executing the graphical portion (or one or more groups of steps, wherein the result of executing the graphical portion determines which group of steps is performed).

Thus, the method may enable a computer-implemented process to be specified using different programming methodologies. For example, as described above, the process specification portion of the process may be created in various ways, such as by selecting steps or operations using a graphical user interface or by referencing or creating text-based program source code, whereas the graphical portion of the process may be created by constructing a block diagram or using other graphical techniques. It is noted that in some embodiments it may be desirable to create multiple graphical portions, e.g., to specify a more complex process. Also, it is noted that in various embodiments the graphical portion(s) of the process may perform functions other than a decision operation.

After specifying the process, the process may be executed. The process may be executed under control of a software application used in specifying the process, or program instructions operable to execute the process in a standalone manner may be created. Also, the process may be executed as software or may be downloaded or embedded in a hardware device. Executing the process may comprise: executing some or all of the steps in the first portion of the process specification (or, where the process specification comprises a script, executing program instructions associated with the steps); executing the graphical portion; and executing one or more steps of the process specification that are dependent on the graphical portion (or executing program instructions associated with these dependent steps). Where the graphical portion is created by creating a graphical block diagram in a respective graphical programming development environment, execution of the graphical portion may involve executing the graphical block diagram in the respective graphical programming development environment.

BRIEF DESCRIPTION OF THE DRAWINGS

A better understanding of the present invention can be obtained when the following detailed description of the preferred embodiment is considered in conjunction with the following drawings, in which.

Figure 1A:
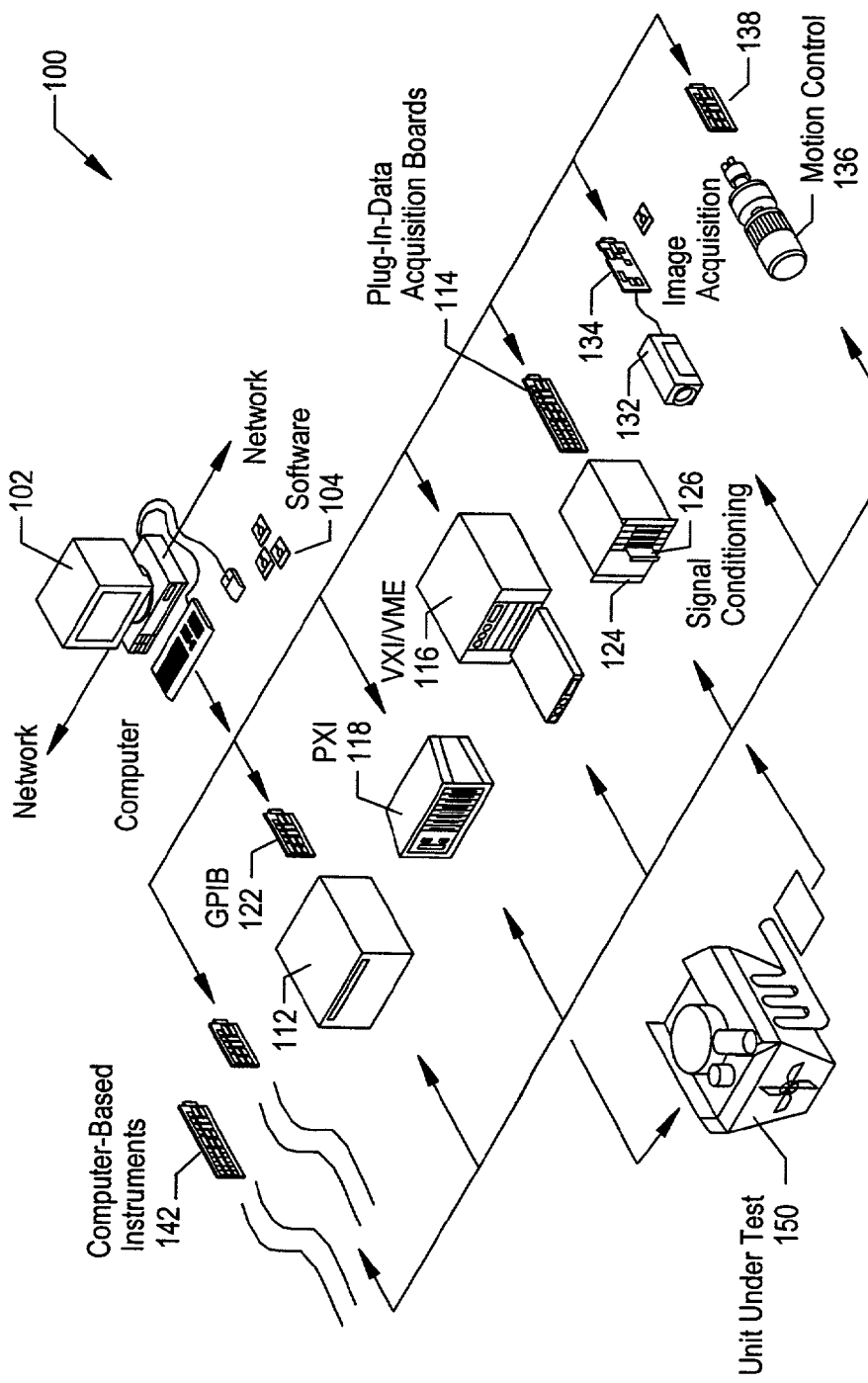
FIGS. 1A and 1B illustrate representative instrumentation and process control systems including various I/O interface options.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/595,003, titled "System and Method for Automatically Generating a Graphical Program to Implement a Prototype," filed Jun. 13, 2000.

Figure 1B:
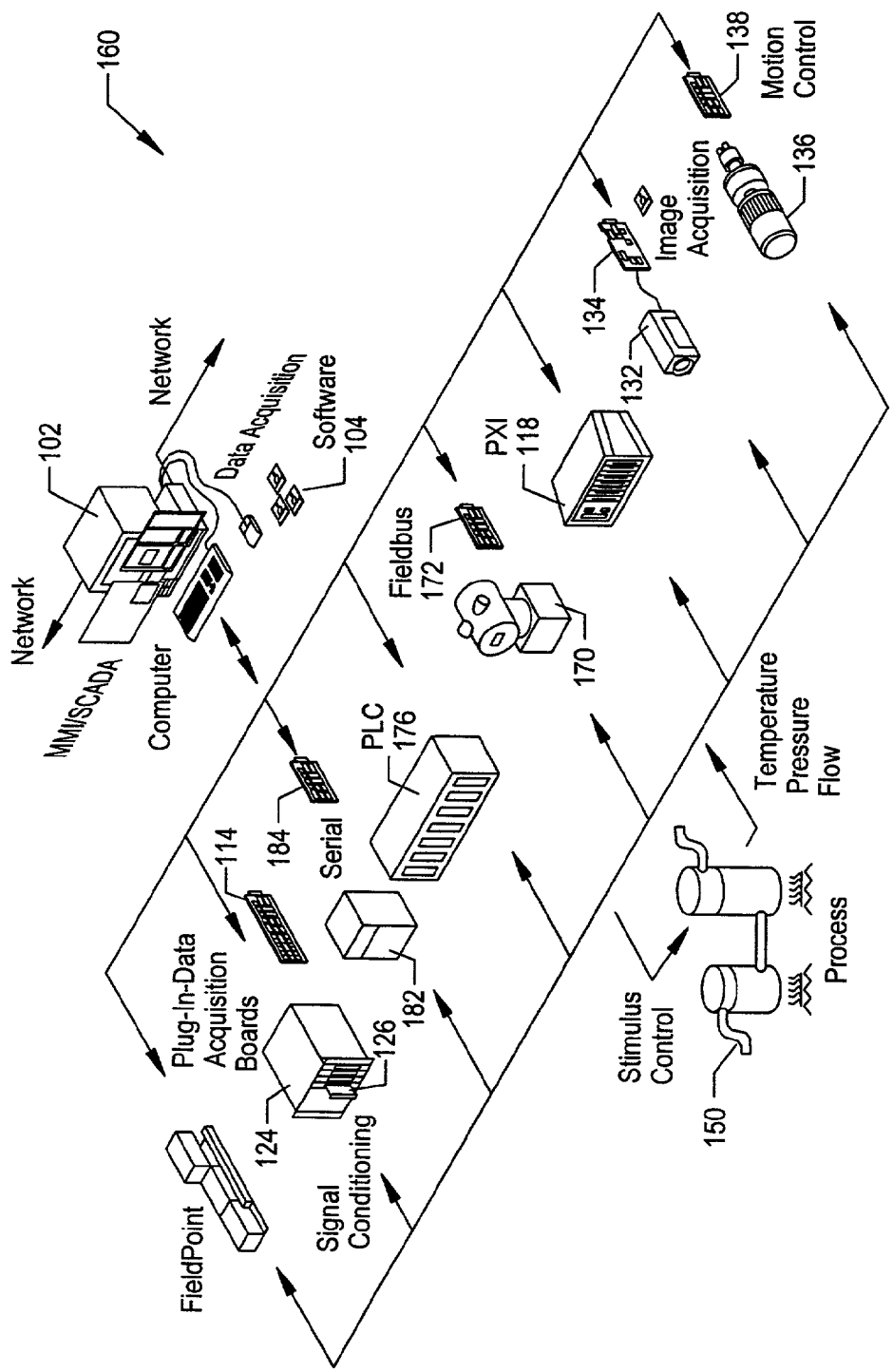

FIGS. 1A and 1B—Instrumentation and Industrial Automation Systems

FIGS. 1A and 1B illustrate exemplary systems which may create, store, and/or execute information specifying a process, wherein the process is specified using two or more different program creation methodologies. The two or more program creation methodologies may comprise 1) specifying a process specification including a plurality of steps selected from a graphical user interface (GUI) and 2) specifying one or more graphical portions, such as by creating a block diagram or graphical program. For example, the process may interact with or control one or more instruments or other devices, such as those shown. The process may also comprise a prototype of a system being designed. It is noted that in other embodiments the information specifying the process may be created on, stored on, or used by any of various other types of systems as desired and may implement any function or application as desired. Thus, FIGS. 1A and 1B are exemplary only.

FIG. 1A illustrates an exemplary instrumentation system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. In one embodiment, the computer 102 may execute a process to control or model one or more of the connected instruments, wherein the process is specified according to the methods described below.

The one or more instruments may include one or more of a GPIB instrument 112 and associated GPIB interface card 122, a data acquisition board 114 and associated signal conditioning circuitry 124, a VXI instrument 116, a PXI instrument 118, a video device or camera 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 may be plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, a test and measurement application, a process control application, a man-machine interface application, a machine vision application, a motion control application, a simulation application, a modeling application, or in various other types of applications.

FIG. 1B illustrates an exemplary industrial automation system 160. The industrial automation system 160 is similar to the instrumentation or test and measurement system 100 shown in FIG. 1A. Elements which are similar or identical to elements in FIG. 1A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, the computer 102 may execute a process associated with the automation function performed by the automation system 160, wherein the process is specified according to the methods described below.

The one or more devices may include a data acquisition board 114 and associated signal conditioning circuitry 124, a PXI instrument 118, a video device or camera 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 may be plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A and 1B, the computer system(s) 102 preferably includes a memory medium(s) on which one or more computer programs or software components according to one embodiment of the present invention may be stored. For example, the memory medium may store process specification information, wherein the process specification information includes a plurality of steps. The memory medium may also store graphically specified information, such as a block diagram. The process specification and the block diagram may collectively specify a process. The computer system(s) 102 may execute the process to perform an application such as those described above (or any of various other types of applications).

The same or a different memory medium may also store one or more software applications operable to create and/or execute the information specifying the process. As described in detail below, the software application(s) may enable the user to include or specify a plurality of steps in a process specification such as a script, e.g., to perform a series of operations. For example the software application may present a graphical user interface (GUI) that allows the user to select steps or operations in the process specification. The series of operations may include operations that interact with one or more of the instruments or devices connected to the computer system(s) 102. The user may then use the software application(s) to graphically specify one or more decision operations based on execution results of these steps, e.g., by constructing a block diagram. If desired, additional steps may be added to the process specification, e.g., to perform various actions depending on a result computed by the specified decision operation(s). As described above, the ability to specify the decision operation(s) graphically may enable the user to implement a desired process more efficiently. In one embodiment the memory medium may store a graphical programming development environment that is used in creating a graphical block diagram specifying a portion of the process and/or used in executing a block diagram.

The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

Figure 2:
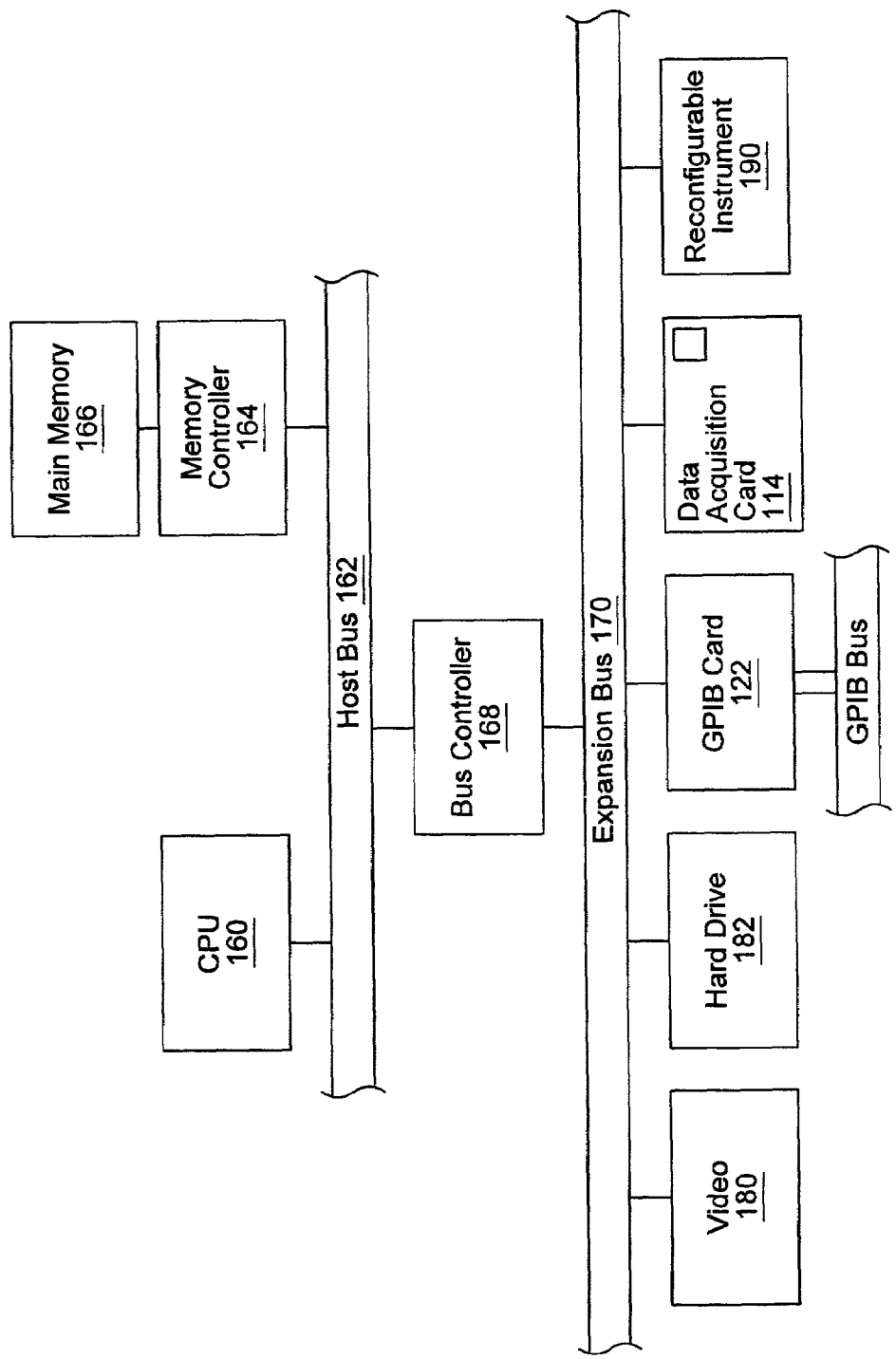
FIG. 2 is a block diagram of the computer system of FIGS. 1A and 1B.

FIG. 2—Computer System Block Diagram

FIG. 2 is a block diagram of the computer system illustrated in FIGS. 1A and 1B. It is noted that any type of computer system configuration or architecture can be used as desired, and FIG. 2 illustrates a representative PC embodiment. It is also noted that the computer system may be a general purpose computer system as shown in FIGS. 1A and 1B, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store process information and/or computer programs executable to create or use the process information according to one embodiment of the present invention. The main memory 166 may also store operating system software as well as other software for operation of the computer system, as well known to those skilled in the art. Computer programs according to one embodiment of the present invention are discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1A) and a GPIB interface card 122 which provides a GPIB bus interface to the GPIB instrument 112 (of FIG. 1A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, process information may be downloaded and executed on the reconfigurable instrument 190. For example, a software application with which the process information is associated may provide support for downloading program instructions executable to implement the process on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIGS. 1A or 1B.

Figure 3:
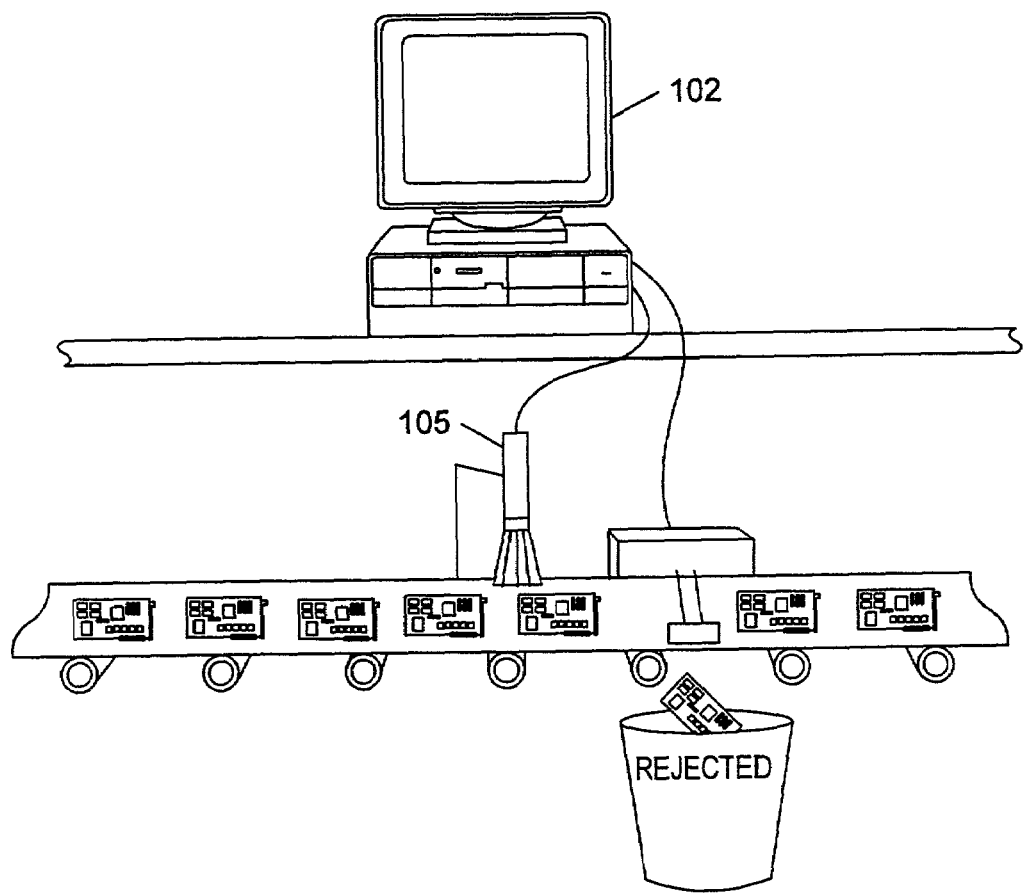
FIG. 3 illustrates a machine vision system or image acquisition system.

FIG. 3—Machine Vision System

FIG. 3 illustrates an exemplary machine vision system or image acquisition system, which is an example of one application of the present invention. In FIG. 3, the computer system 102 is coupled to a camera 105 and operates to acquire one or more images, e.g., images of manufactured devices moving along an assembly line. The computer system 102 may be operable to execute a process specified by a process specification and a graphical portion (block diagram). The process specification may include or specify a plurality of machine vision steps (or image processing steps) to analyze the acquired images. The graphical portion may specify a decision operation to compute an inspection result depending on execution results of the machine vision steps. For example, the inspection result may be used for quality control purposes, to decide whether to accept or reject the device. For example, the process specification may include a pattern-matching step, and if the execution of the pattern-matching step produces a result indicating that the necessary pattern was not found, then the device may be rejected. As described in more detail below, a user may specify the decision operation graphically by constructing a block diagram that uses various execution results determined by the machine vision steps.

It is noted that the computer 102 may be embodied in various form factors and/or architectures, e.g., a robot or embedded device, among others. It is also noted that the execution of the process may be performed in any of various manners, e.g., in software, programmable logic, or hardware, or a combination thereof, and may be executed as a standalone program or under control of another program.

Figure 4:
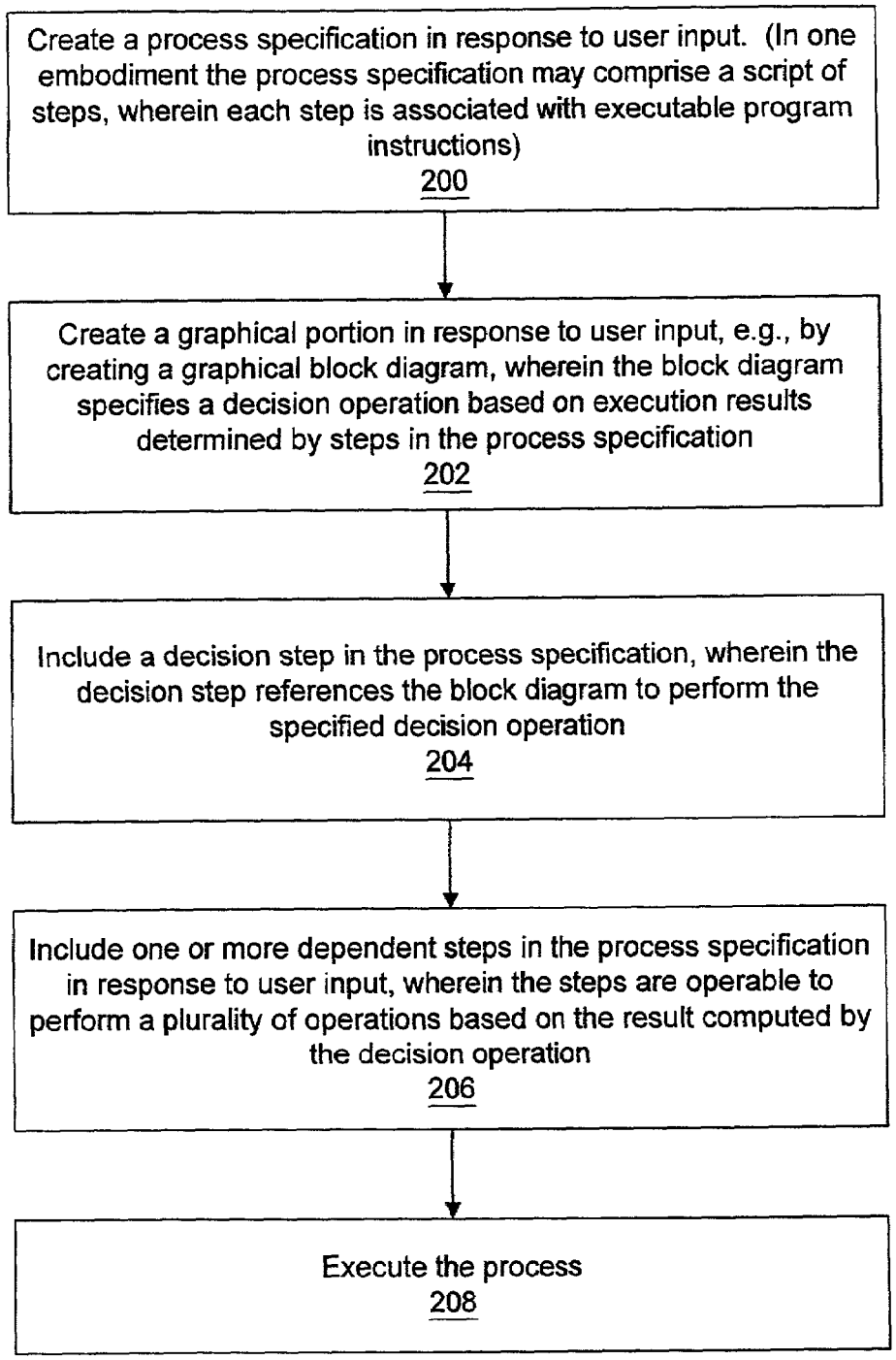
FIG. 4 is a flowchart diagram illustrating one embodiment of a method for specifying a computer-implemented process utilizing two or more different program creation methodologies.

FIG. 4—Method for Specifying a Computer-Implemented Process

FIG. 4 is a flowchart diagram illustrating one embodiment of a method for specifying a computer-implemented process utilizing two or more different program creation methodologies. In various embodiments, the method may be employed to specify a process for any purpose or application. For example, the process may interact with or control one or more instruments, such as described above with reference to FIGS. 1A and 1B, e.g., for a machine vision application, image processing application, data acquisition and control application, test and measurement application, process control application, simulation application, or other type of application. In other embodiments, the specified process may not interact with instrumentation but may be a purely software process, e.g., a software algorithm.

At least a portion of the process may be dependent on prior execution results determined by a previous or first portion of the process. As an example, for a machine vision inspection process, the first portion of the process may analyze images of a product, and a subsequent portion of the process may depend on the results of the image analysis, e.g., may either accept or reject the product depending on prior execution results of the image analysis portion. Thus, the process may include one or more decision operations that analyze the prior execution results. The execution of the portion of the process that is dependent on the prior execution results may depend on the outcome of the decision operation. As described below, the decision operation may advantageously be specified graphically, e.g., as a block diagram constructed in response to user input.

As illustrated in step 200, the functionality or operation of the process may be specified in part by creating a "process specification" in response to user input. In various embodiments, the process specification may comprise various types of information and may be created in various ways. For example, in one embodiment, the process specification may comprise a "script" or list of steps or operations. The script itself is not a computer program and is not executable. However, each step in the script may be associated with executable program instructions. Thus, when the process is desired to be executed, the executable program instructions associated with each step may be executed. For example, a software application that was used to create the script may be operable to determine the steps in the script and invoke the program instructions associated with the steps. When executed, the program instructions associated with the steps in the script may perform a desired function or may compute desired information. For example, the steps may together define an algorithm (or portion of an algorithm). For example, in a machine vision application, the steps may be operable to analyze an image of a product under inspection.

In other embodiments, the process specification may comprise information other than a script such as described above. For example, in one embodiment the process specification may include references to various executable or source code modules or objects, such as C or C++ modules, Java modules, DLLs, shared libraries, graphical programs, or executable or source code packaged in any other standard or proprietary form. In this instance, including a step in the process specification may comprise including a reference to the desired executable or source code in the process specification. The executable or source code associated with the steps may then be executed when the process is desired to be executed.

It is noted that steps in the process specification may be executed sequentially or in various other ways. For example, in one embodiment, the steps may execute in serial order. In another embodiment, the user may specify groups of steps to be executed in parallel. Also, in one embodiment, additional information may be included in the process specification which affects the execution of the steps. For example, the user may specify loops among the steps or branching information for various steps. Thus, in some embodiments, the process specification may include more complex program information in addition to references to the steps.

In another embodiment, the process specification may itself be a computer program, e.g., a program entirely or partially constructed using a text-based programming language such as C, C++, Java, Visual Basic, Pascal, FORTRAN, etc. For example, the user may select steps or operations which causes construction a computer program including various function or method calls such that the program is operable to perform a desired function or compute desired information when executed. The process specification may itself be a graphical program that is automatically created as the selected steps or operations from the GUI. In this instance, in step 200 the graphical program created serves as a mechanism to record the steps selected by the user.

The process specification may be created in various ways. In one embodiment, the user may use a software application that provides a graphical user interface for selecting various steps or operations, e.g., from a palette or menu, and including them in the process specification. In response to the user selecting various steps or operations, the steps may be recorded in a script, or alternatively program instructions may be referenced or automatically created and included in a computer program. In one embodiment, the graphical user interface may comprise a "wizard" that displays one or more GUI panels on the display for the user to input data or information that specifies at least a portion of the process. In one embodiment, the user may specify various steps by interactively selecting operations, e.g., from a palette or menu, and interactively applying the operations to an object, such as by selecting image processing operations to apply to an image. For example, a software application may provide specialized support for creating processes of a certain type, e.g., machine vision processes or data acquisition processes. The software application may enable the user to select desired steps or operations from a specialized library or set of steps or operations. For example, an application specialized for specifying machine vision processes may provide a library of various machine vision or image processing operations, such as pattern-matching operations, edge detection operations, etc. One example of a software application specialized for creating scripts for machine vision or image processing applications is the IMAQ VisionBuilder application from National Instruments.

The user may also specify steps of a script in any of various other ways, such as by applying operations to or manipulating a physical or simulated system. For example, for a robotics application, the user may control movement of a real or simulated robotic arm, and in response, steps operable to automatically reproduce the movements may be included in the script. In a motion control application the user may control a simulated 2-D or 3-D image of the motion control device, and in response steps or program instructions may be created.

As the user selects various steps or operations using the GUI, the steps may be recorded in a script. Alternatively, as the user selects various steps or operations using the GUI, program instructions may be alternatively included in a computer program. Thus the user creates the process specification through a high level user interface that involves selecting operations or specifying operation in a GUI panel, and the process specification is not created solely through direct user creation and editing of a program (either a textual program or graphical program).

In addition to the process specification, one or more portions of the process may be specified graphically, e.g., through graphical programming techniques. In step 202, a graphical portion of the process may be created in response to user input. In one embodiment the graphical portion may specify a decision operation based on execution results determined by operations or steps in the process specification. As described above, for many processes it is necessary to perform one or more decision operations.

The graphical portion(s) of the process may be specified in any of various ways. In one embodiment, a diagram, e.g., a block diagram may be created. As used herein, the term "block diagram" may refer to a plurality of interconnected nodes or icons which visually indicate the functionality of the diagram or program, wherein the nodes or icons may be connected in one or more of a data flow, control flow, or execution flow manner. The nodes or icons may also be connected to represent "signal flow", wherein signal flow is considered a subset of data flow.

The block diagram may include nodes representing result values determined by execution of one or more operations in the process specification. The block diagram may also include various function nodes, e.g., to perform mathematical or other functions on the execution result values. The block diagram may include various structure nodes that perform looping, iteration, conditional branching, and sequencing operations. The block diagram nodes may be interconnected, e.g., in one or more of a data flow, control flow, and/or execution flow format, so as to specify a desired decision operation or other functionality. The block diagram may then be analyzed or compiled to create program instructions executable to implement the functionality specified by the block diagram.

In one embodiment, a graphical programming development environment may be used in creating the block diagram. Examples of a graphical programming environment include LabVIEW, Diadem and DasyLab from National Instruments, VEE from Agilent, SoftWIRE from Measurement Computing, Simulink from The MathWorks, and VisSim from Visual Solutions, among others. One embodiment of a method for constructing a block diagram to specify a decision operation is described below with reference to FIG. 6.

In one embodiment, a decision step may optionally be included in the process specification in response to the created graphical block diagram, i.e., the graphically specified decision operation, as shown in step 204. The decision step may reference the data structures or program instructions created for the block diagram, such that when the process is executed, these program instructions are executed to perform the specified decision operation. Thus, executing the program instructions associated with the decision step may compute a result (or results) that is based on execution results of at least a subset of the operations specified in the process specification, i.e., a result that is based on the execution results used in the decision operation. It is noted that in other embodiments, the decision operation may be performed when the process is executed, but an explicit decision step may not be included in the process specification.

In step 206, dependent steps may be included in the process specification in response to user input. The result(s) computed by the graphical portion may thus be used to control the execution of subsequent (dependent) steps in the process specification. The process specification thus may also include steps or operations that utilize or depend on the result(s) computed by the graphical portion(s) of the process. For example, as described above, it may be necessary or desirable for the process specification to include steps that are dependent on prior execution results determined by a previous portion of the process specification. For example, consider a decision operation for a machine vision application that is operable to compute a Pass/Fail inspection result based on parameters returned by image analysis steps in the process specification. In this example, the dependent steps included in the process specification in step 206 may include: a step operable to remove the product from an assembly line if the result is Fail; a step operable to log a record in a first database table if the result is Pass or a second database table if the result is Fail; etc.

In step 208, the process may be executed. The process may be executed under control of a software application used in specifying the process, or program instructions operable to execute the process in a standalone manner may be created. Also, the process may be executed as software or may be downloaded or embedded in a hardware device. Executing the process may comprise executing some or all of the process specification steps specified in step 200, e.g., depending on branching or other control flow optionally specified for these steps (or, where the process specification comprises a script, executing the process may comprise executing program instructions associated with the steps). Executing the process may also comprise executing the graphical portion and executing one or more steps of the process specification that are dependent on the graphical portion (or executing program instructions associated with these dependent steps). Where the graphical portion is created by creating a graphical block diagram in a respective graphical programming development environment, execution of the graphical portion may involve executing the graphical block diagram in or in conjunction with the respective graphical programming development environment.

The above-incorporated patent application titled, "System and Method for Automatically Generating a Graphical Program to Implement a Prototype" describes techniques for programmatically generating a standalone graphical program to implement a process or algorithm. It is noted that in one embodiment, similar techniques may be applied to programmatically generate a standalone graphical program executable to implement a process specified according to the method described above. When programmatically generating such a graphical program, the user-specified graphical portion of the process may not need to be modified or may need to be modified only a small amount. For example, the user-specified graphical portion may already be constructed according to graphical programming techniques of a particular graphical programming development environment. Thus, in this embodiment, the process specification may be programmatically converted into a graphical program portion, and the user-specified graphical portion or block diagram may be automatically (programmatically) or manually connected to the graphical program portion programmatically created from the process specification.

As described above, result values of the process specification may be used as inputs to the block diagram. Thus, an output terminal for each result value or output parameter of the process specification that is used in the user-specified block diagram portion may be automatically included in the graphical program portion programmatically generated from the process specification. In one embodiment, the user may manually wire together these output terminals to respective input terminals of the user-specified block diagram. In another embodiment this wiring may be performed automatically.

In one embodiment, the graphical program portion representing the process specification may appear as one simple graphical node from which the required output terminals are exposed so that the output terminals can be wired to input terminals of the user-specified block diagram. In one embodiment, this one graphical node may encapsulate other graphical code, e.g., a plurality of interconnected nodes that implement the functionality of the process specification, which the user may request to view, e.g., to modify the programmatically generated graphical code.

In one embodiment, the entire process may be recorded in a graphical programming development environment, even though the process specification portion and the block diagram portion are specified by the user in different manners. Here the distinction between the process specification portion and the block diagram portion is the manner in which the two are created, not how they are stored or represented. For example, the user may create or specify the process specification using high level GUI panels, such as in a wizard-based manner, or by applying operations to an object such as an image or motion control device, and the steps or operations specified by the user in this manner may be recorded as a graphical program portion. The user may then create or specify the graphical program portion (block diagram portion) through direct creation and editing of a graphical program, e.g., by selecting icons or nodes to be displayed in a block diagram window and connecting the nodes, such as in the way a graphical program is created in LabVIEW.

It is noted that in various embodiments, steps may be added, omitted, or modified for the flowchart of FIG. 4. Also, the steps may be performed in various orders. For example, in some embodiments it may possible to include steps in the process specification that depend on a result computed by a graphical block diagram before actually creating the graphical block diagram. As another example, it is noted that various steps of the flowchart may be performed multiple times, e.g., to define multiple graphical portions for a process. For example, in one embodiment, a process may be organized such that there are multiple decision operations, multiple groups of steps that compute execution result values used in these decision operations, etc.

FIG. 5

As described above with reference to the method of FIG. 4, in one embodiment of defining a computer-implemented process, the following may be created: a first portion of a process specification that includes steps or operations operable to determine one or more execution result values; a graphical portion that utilizes the execution result values determined by the first portion of the process specification to compute a result; and a second portion of the process specification that includes steps or operations that depend on the result computed by the graphical portion, i.e., steps or operations operable to perform different functionality depending on the result of executing the graphical portion (or one or more groups of steps, wherein the result of executing the graphical portion determines which group of steps is performed).

Thus, the method may enable a computer-implemented process to be specified using different programming methodologies. For example, as described above, the process specification portion of the process may be created in various ways, such as by selecting steps or operations using a graphical user interface or by referencing or creating text-based program source code, whereas the graphical portion of the process may be created by constructing a block diagram or using other graphical techniques.

Figure 5:
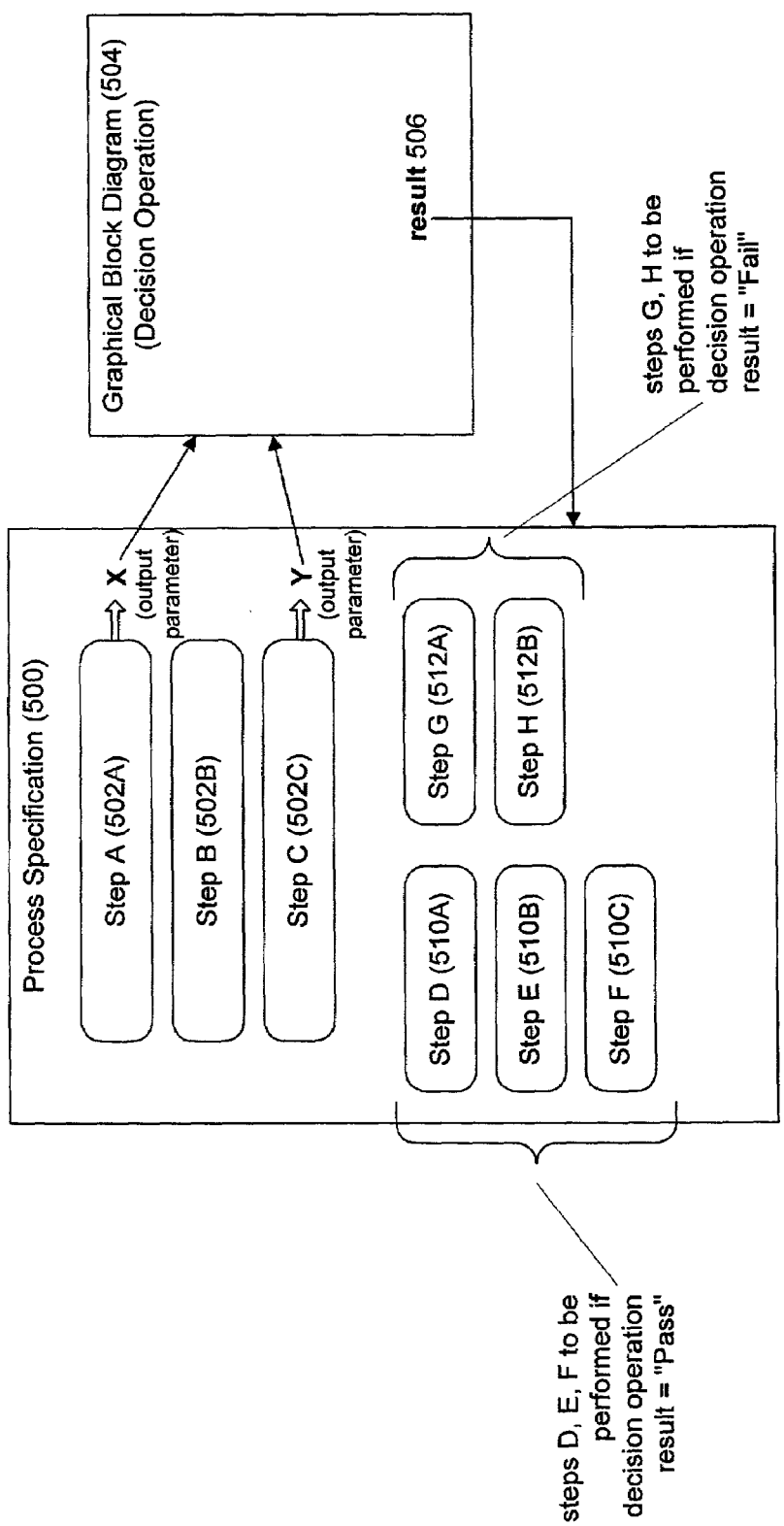
FIG. 5 illustrates a process specification which functions in conjunction with a graphical block diagram to perform a process.

FIG. 5 illustrates a process specification 500 which functions in conjunction with a graphical block diagram 504 to perform a process. The process specification 500 includes a first group of steps 502 (step A, Step B, and step C). As shown, step A is operable to determine an output parameter X, and step C is operable to determine an output parameter Y. The graphical block diagram 504 is operable to use the X and Y values as input parameters to a decision operation operable to compute one or more results. For example, the graphical block diagram may compute a Pass/Fail result 506.

The process specification also includes a group of steps 510 (step D, step E, and step F) and a group of steps 512 (step G and step H). The value of the result 506 computed by the graphical block diagram may determine which of these groups of steps is performed. If the result is "Pass" then steps D, E, and F may be performed, or if the result is "Fail" then steps G and H may be performed. In various embodiments, this behavior may be implemented in any of various ways. For example, a software application used to create the process specification may enable steps to be partitioned into logical groups corresponding to possible result values of the graphical block diagram, or the result value of the graphical block diagram may be provided as an input parameter to the steps, and the behavior of the steps may depend on the value.

Figure 6:
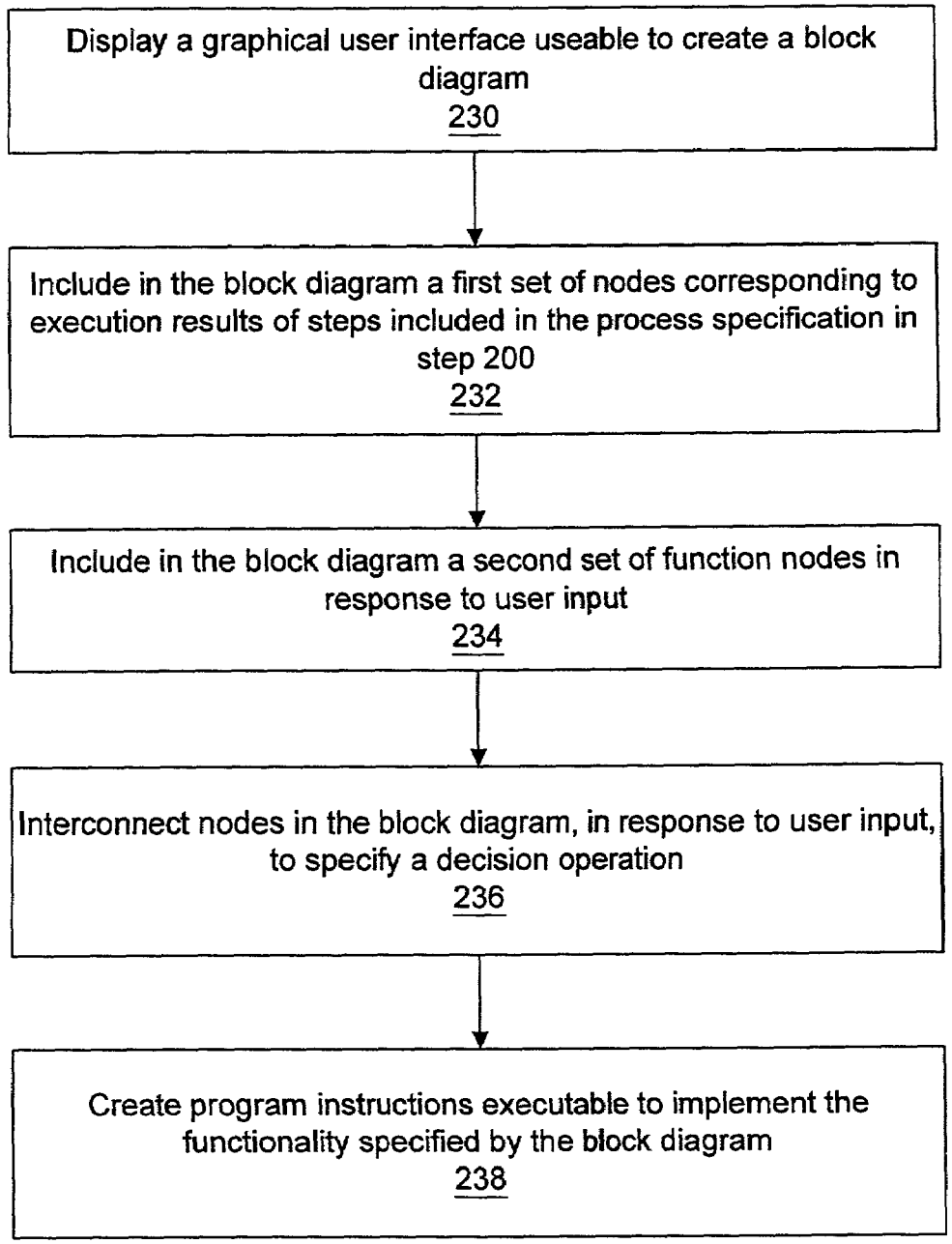
FIG. 6 is a flowchart diagram illustrating one embodiment of a method for constructing a block diagram to specify a decision operation.

FIG. 6—Specifying a Decision Operation with a Block Diagram

FIG. 6 is a flowchart diagram illustrating one embodiment of a method for constructing a block diagram to specify a decision operation. In step 230, a graphical user interface useable to create a block diagram for the decision operation may be displayed, e.g., in response to user input indicating a desire to create the decision operation diagram.

In step 232, a first set of nodes may be included in the block diagram, wherein these nodes correspond to execution results of steps included in the process specification in step 200. In the preferred embodiment, only nodes corresponding to execution result values desired to be used in the decision operation are included in the block diagram. In other words, a plurality of execution results may be associated with the steps of the process specification, but it may be desirable to select only a subset of these to use in the decision operation. In various embodiments, the execution results associated with the steps may be selected in various ways, e.g., depending on how the steps are implemented in a particular embodiment. For example, each step may have zero or more output parameters indicating execution results of the step when the step is executed (or when program instructions corresponding to the step are executed). Thus, the user may select the desired output parameters to be used in the decision operation.

In one embodiment, the method may operate to display a list of all the possible execution results for steps in the process specification, e.g., a list of output parameters for the steps, and the user may select the desired items from this list. Nodes corresponding to the selected items may then be automatically included in the block diagram. In one embodiment, this list may be displayed before the graphical user interface is displayed in step 230, such that when the graphical user interface appears, it already includes the desired nodes. In another embodiment, the user may select the desired parameters or execution results individually, e.g., by dragging an icon corresponding to each one from a palette onto the block diagram to create a new node.

In step 234, a second set of nodes may be included in the block diagram in response to user input. This second set of nodes may include various function nodes, e.g., nodes operable to perform mathematical or other functions. For example, the user may select the desired function nodes from a palette or menu. The second set of nodes included in the block diagram may also include other types of nodes, such as constant value nodes.

In step 236, nodes of the block diagram may be interconnected, in response to user input, to specify the desired decision operation. As a simple example, consider a process specification that includes a first step having an output parameter X and a second step having an output parameter Y. If the decision operation needs to verify that X is less than Y in order to generate a "Pass" result value, then the user may provide user input to connect two nodes representing the X and Y parameters to input terminals of a "Less Than" function node, wherein the "Less Than" function node has an output terminal that produces a Boolean value indicating whether X is less than Y.

In one embodiment, the decision diagram may include various other features in addition to function nodes, e.g., programmatic structures such as loops, case structures, etc. In one embodiment, the method may enable the user to specify the decision diagram using the complete set of features available from a full graphical programming language, such as the G graphical programming language used by National Instruments Corp.'s LabVIEW graphical programming development environment. Thus, in one embodiment, the decision diagram may be implemented as a graphical program or subprogram.

Performing the decision operation according to the specified data flow, control flow, and/or execution flow may result in one or more result values being computed. For example, the decision operation may return a Pass/Fail value, an integer value indicating a status code, etc. In various embodiments, subsequent steps that depend on the result value(s) computed by the decision operation may obtain the result value(s) in any of various ways. For example, the user may specify that a result value be passed as an input parameter to one of these dependent steps.

In step 238, program instructions executable to implement the functionality specified by the block diagram may be created. For example, in response to the user constructing the block diagram, data structures or executable code that corresponds to the displayed procedure may be automatically created. These program instructions may be executed when the process is executed.

Figure 7:
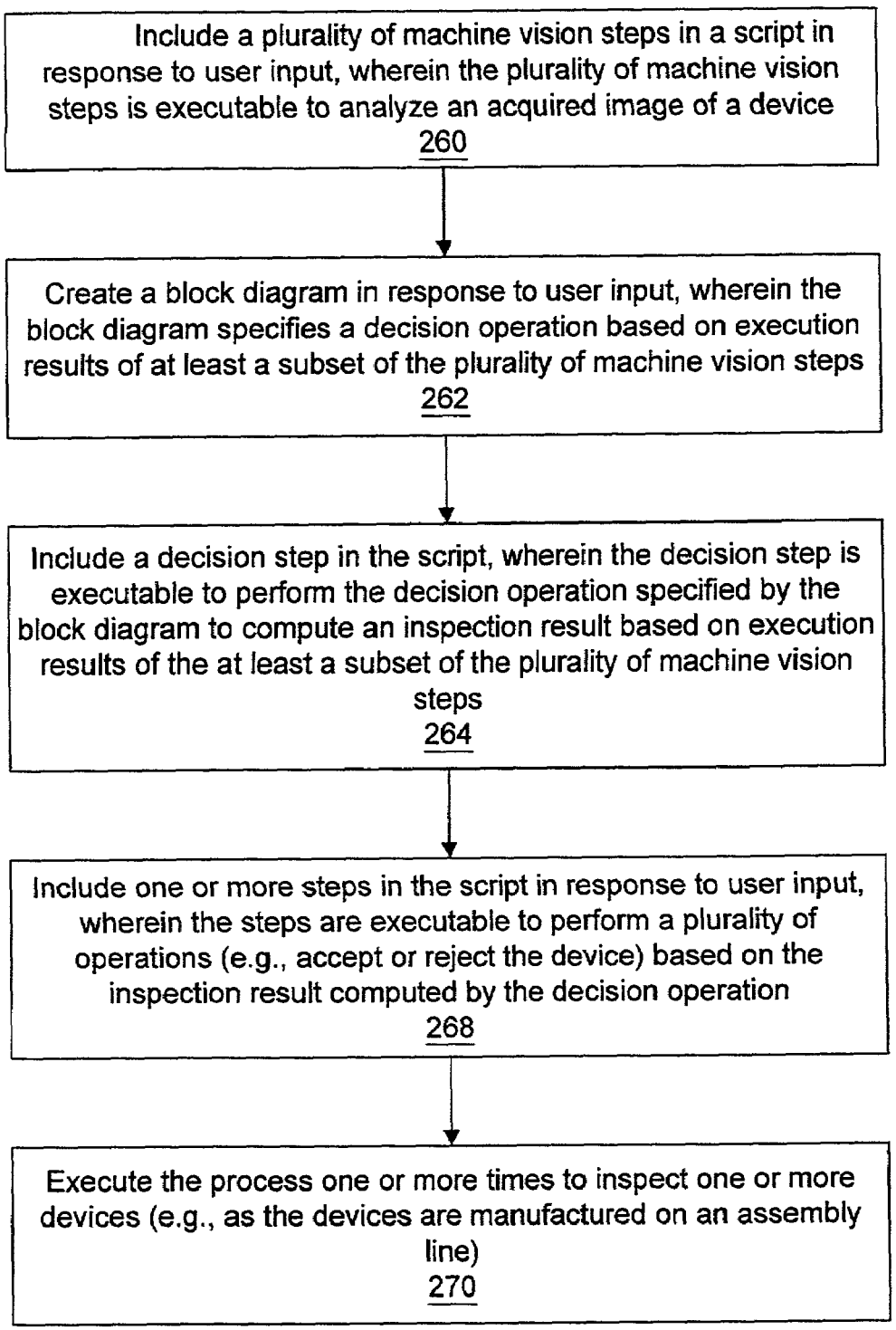
FIG. 7 is a flowchart diagram illustrating one embodiment of a method for specifying a machine vision process operable to inspect a device.

FIG. 7—Method for Specifying a Machine Vision Process

FIG. 7 is a flowchart diagram illustrating one embodiment of a method for specifying a machine vision process operable to inspect a device. The flowchart of FIG. 7 is similar to the flowchart of FIG. 4 described above and illustrates one particular application of the method of FIG. 4.

In step 260, a plurality of machine vision steps may be included in a script in response to user input, wherein the plurality of machine vision steps is operable to analyze acquired images of a device. The machine vision steps may be operable to perform any of various types of operations related to machine vision or image processing, including filtering functions, morphology functions, histogram functions, particle analysis functions, edge detection functions, thresholding functions, pattern matching functions, color matching functions, etc. Step 260 may be performed in any of various ways, as described above with reference to FIG. 4. In a typical embodiment, the application program displays an image. The user may then select and apply various operations to the image, wherein the steps or operations are recorded in a process specification. The selected steps or operations may be immediately applied to the image to allow the user to view how the selected steps affect the image. In this manner, the user may interactively create an image processing algorithm or prototype.

In step 262, a block diagram may be created in response to user input, wherein the block diagram specifies a decision operation based on execution results of at least a subset of the plurality of machine vision steps included in the script in step 260. Step 262 may be performed in any of various ways, as described above with reference to FIG. 4.

In step 264, a decision step may be included in the script, wherein the decision step references program instructions executable to implement the decision operation specified by the block diagram to compute an inspection result based on execution results of one or more of the plurality of machine vision steps.

In step 268, one or more steps may be included in the script in response to user input, wherein the steps are operable to perform a plurality of operations based on the inspection result computed by the decision operation. For example, these steps may be operable to accept or reject the device depending on the inspection result, log a status for the device to a database, etc.

In step 270, the process may be executed one or more times to inspect one or more devices, e.g., as the devices are manufactured on an assembly line.

FIGS. 8–21: Machine Vision Example

Figure 8:
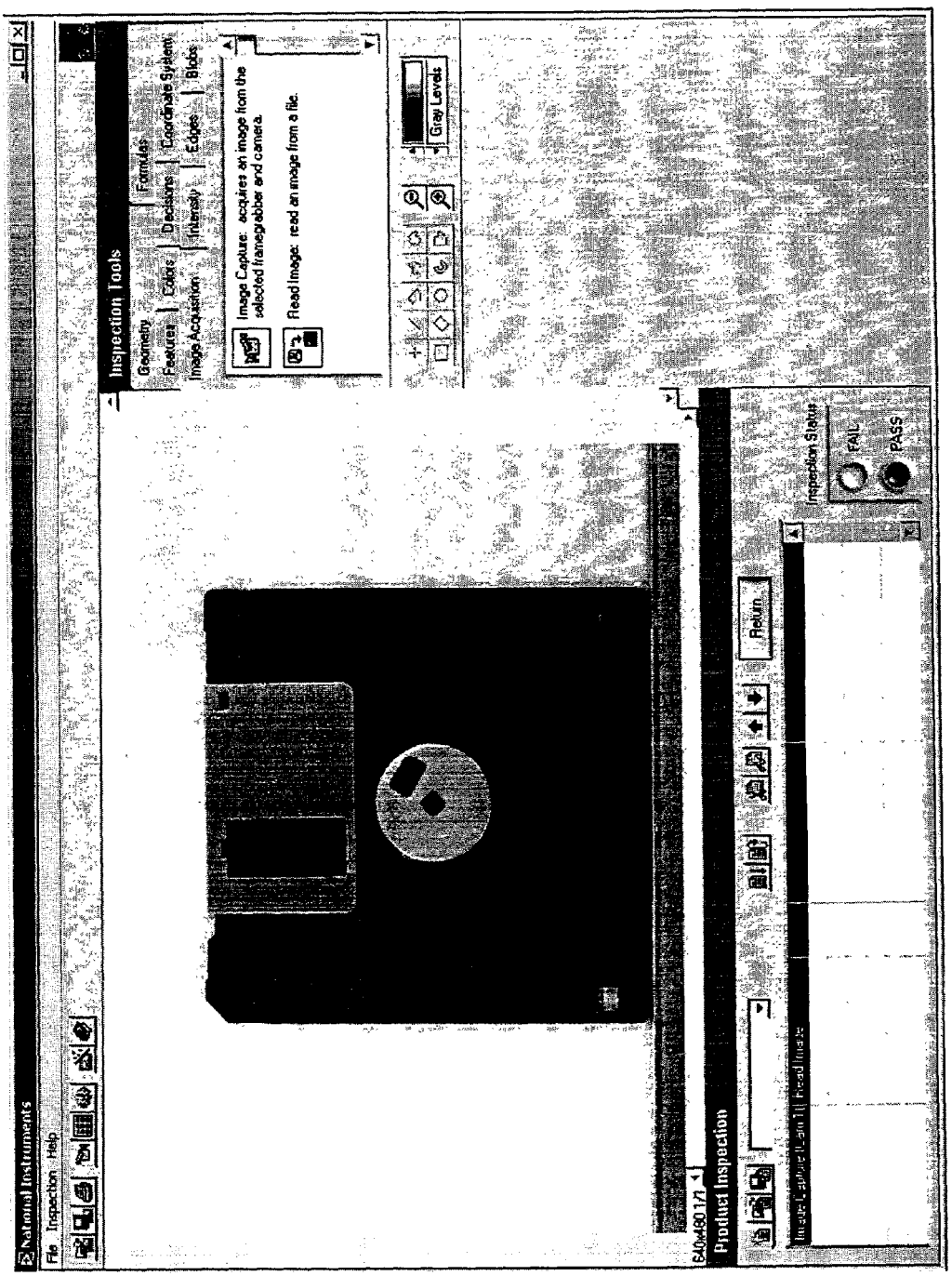
FIGS. 8–21 illustrate an exemplary software application usable to specify a machine vision process according to one embodiment of the methods described herein.

FIGS. 8–21 illustrate an exemplary software application usable to specify a machine vision process according to one embodiment of the methods described above. FIG. 8 illustrates a graphical user interface for the machine vision software, in which there are three main areas: an image space which illustrates a current image being analyzed (in this case an image of a floppy disk); an "Inspection Tools" area to choose from a set of machine vision steps; and a "Product Inspection" area which shows machine vision steps that have been added to a script for the process under development.

In FIG. 8, a "Read Image" step has been included in the script. This step is operable to read an image from a file on the computer system. Subsequent steps can then analyze this image.

Figure 9:
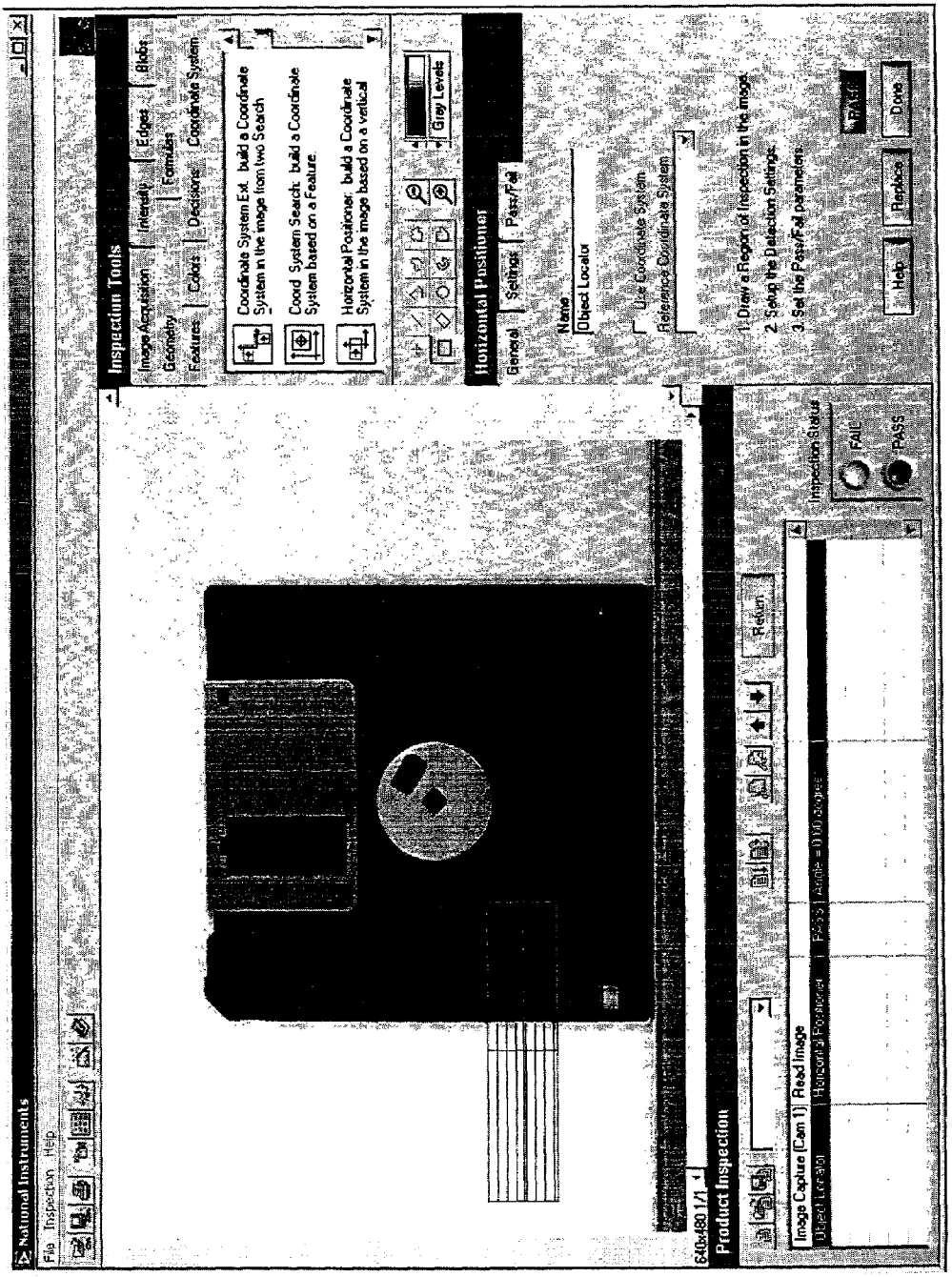

In FIG. 9, a "Horizontal Positioner" step has been added to the script. This step locates the left edge of the floppy disk, i.e., locates the object under inspection within the image. As shown, when this operation is selected, the operation is applied to the image, and the step is recorded in the process specification and also displayed on the screen.

Figure 10:
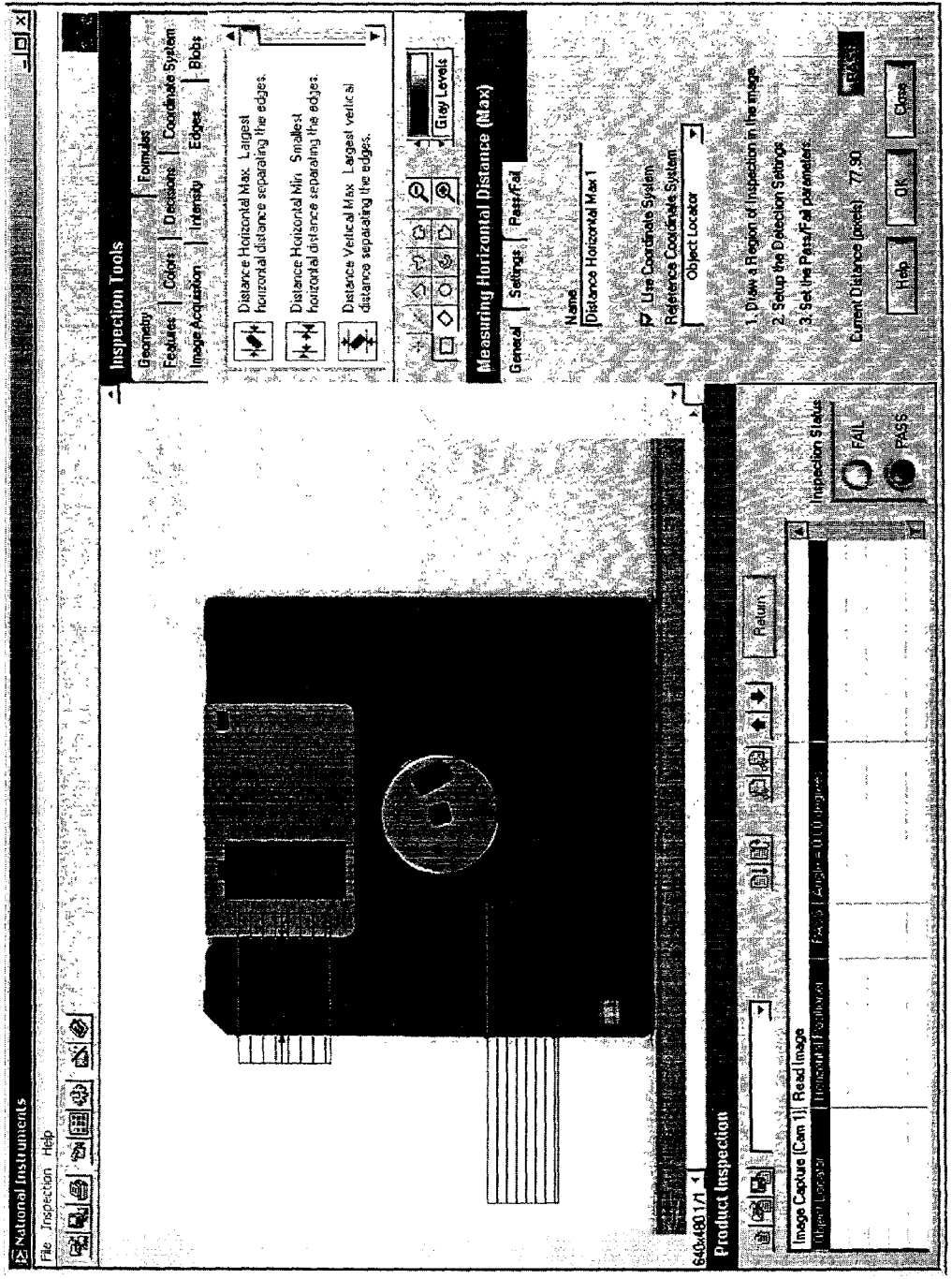

The next step to be added is a "Distance Horizontal Max" step. This step can be configured to check the position of the sliding flap of the floppy. The step measures the distance between the left side of the disk and the left side of the flap. FIG. 10 illustrates a section at the bottom right labeled "Measuring Horizontal Distance (Max)" where there are three property panels (General, Settings, and Pass/Fail) that may be used to configure the step. In FIG. 10, the step is being configured and has not yet been added to the script.

Figure 11:
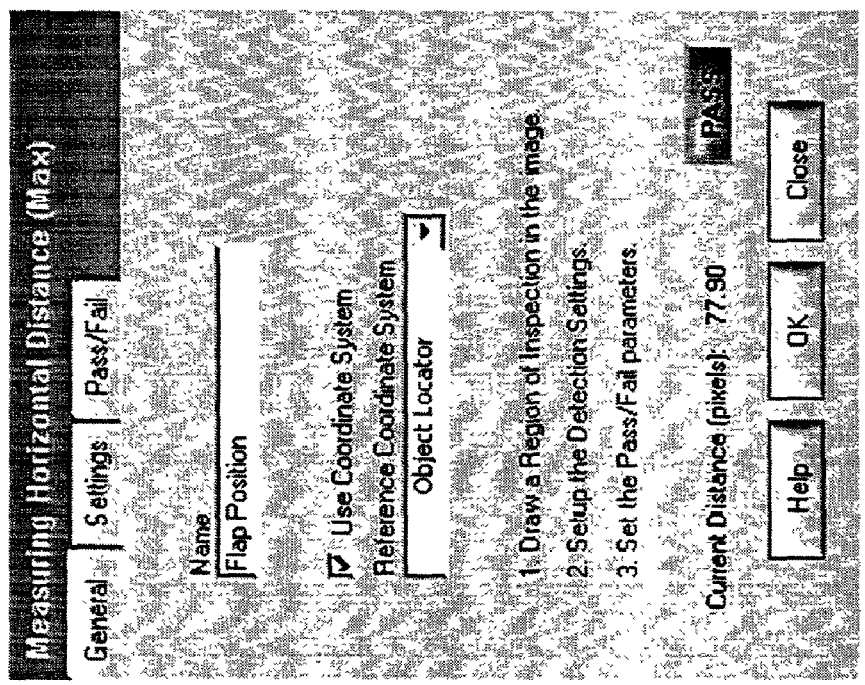
Figure 12:
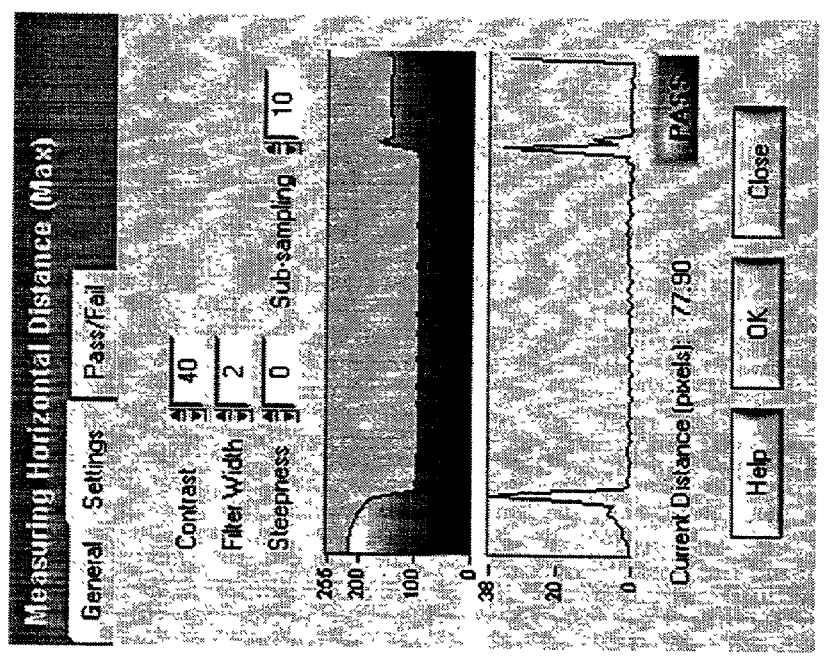
Figure 13:
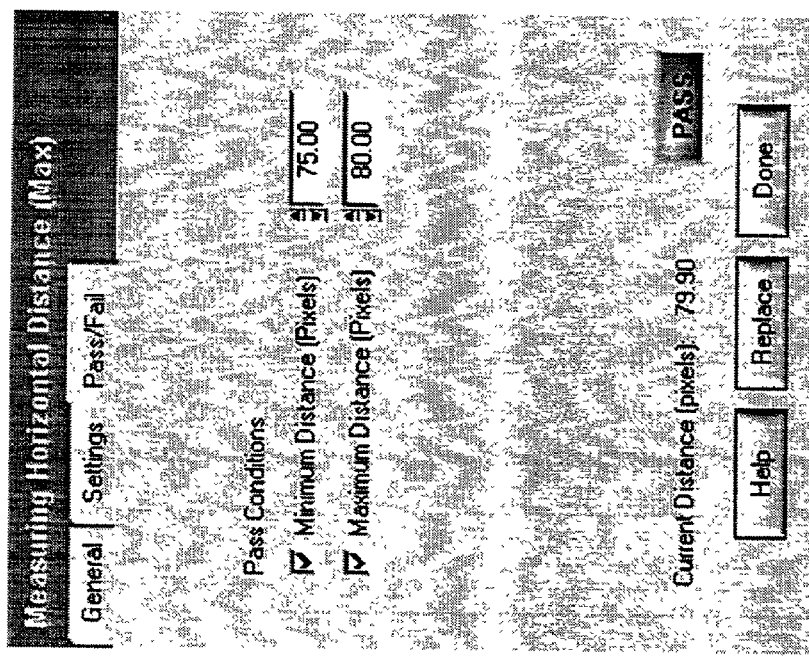

FIGS. 11–13 illustrate the three property panels for the "Distance Horizontal Max" step in more detail. FIG. 11 illustrates the General panel, which includes fields to specify a name for the step, a coordinate system on which to base the step, etc. FIG. 12 illustrates the Settings panel, which includes fields to set parameters affecting the edge detection algorithm used by the step. FIG. 13 illustrates the Pass/Fail panel, which includes fields relating to a "local" decision operation. In other words, this panel may be used in deciding whether the results of this single step should be considered as pass or fail results. If desired, this local pass/fail result may be used as one of the values affecting a decision operation defined by a diagram.

Figure 14:
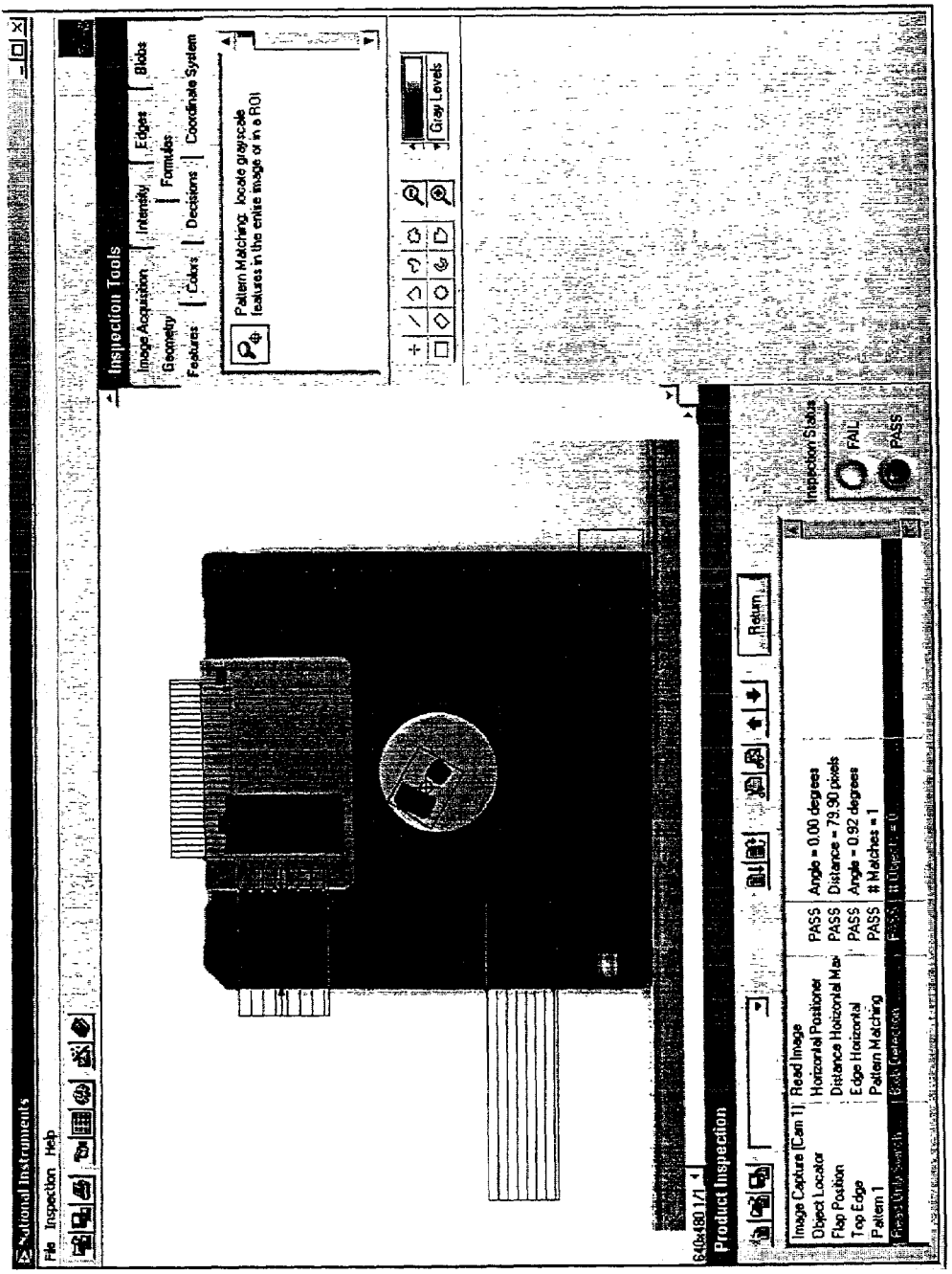

FIG. 14 illustrates the state of the script after the "Distance Horizontal Max" step and three additional steps ("Edge Horizontal", "Pattern Matching", and "Blob Detection") have been added. The script in FIG. 14 illustrates the complete list of steps for analyzing the image of the floppy disk.

Figure 15:
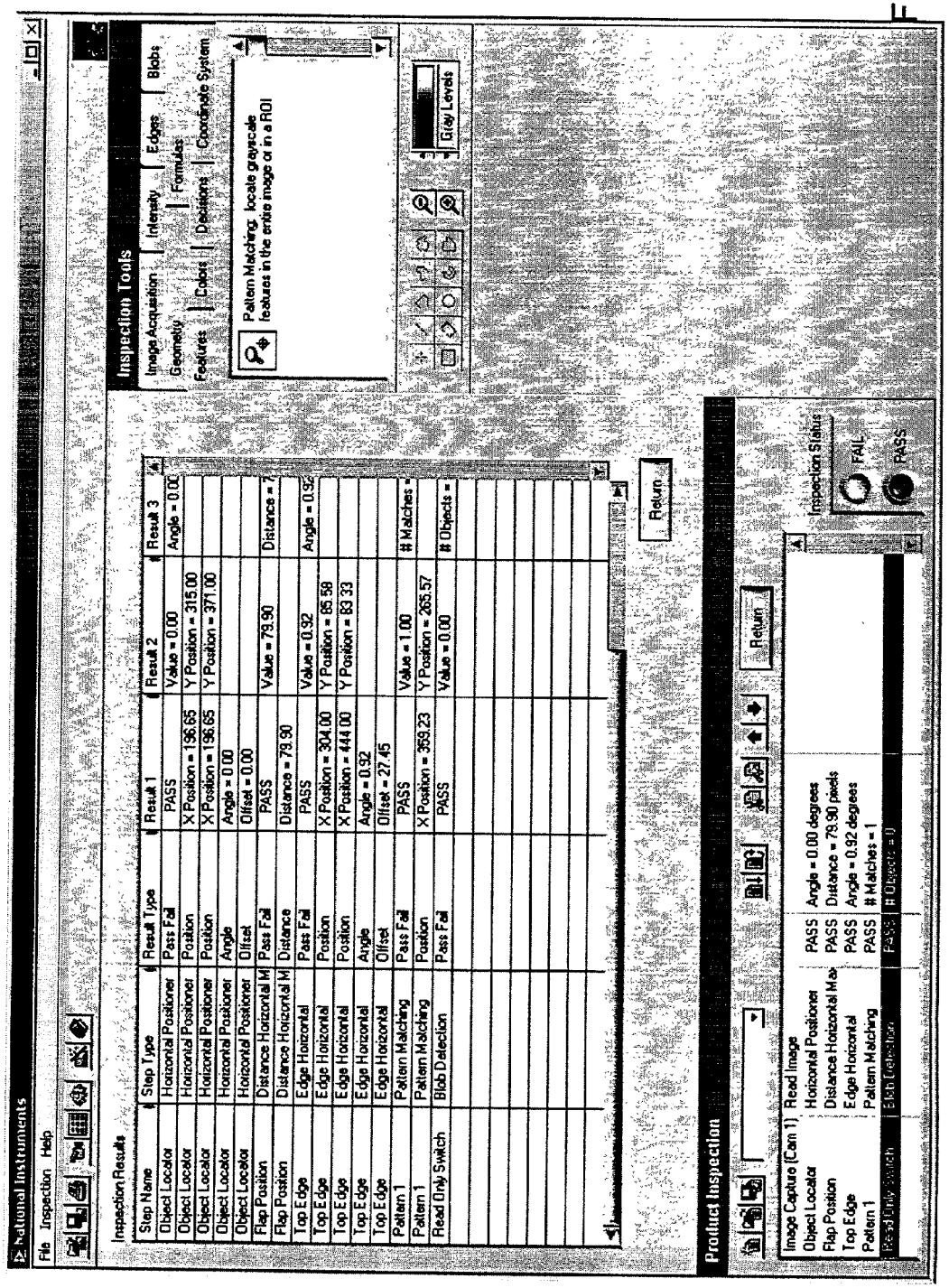

As described above, each step in the script may have zero or more associated execution result values. FIG. 15 illustrates a table in which the execution result values for the steps are shown. The step with which each execution result value is associated is indicated in the "Step Name" column. The table includes measurement values determined by the steps, as well as local pass/fail values.

Figure 16:
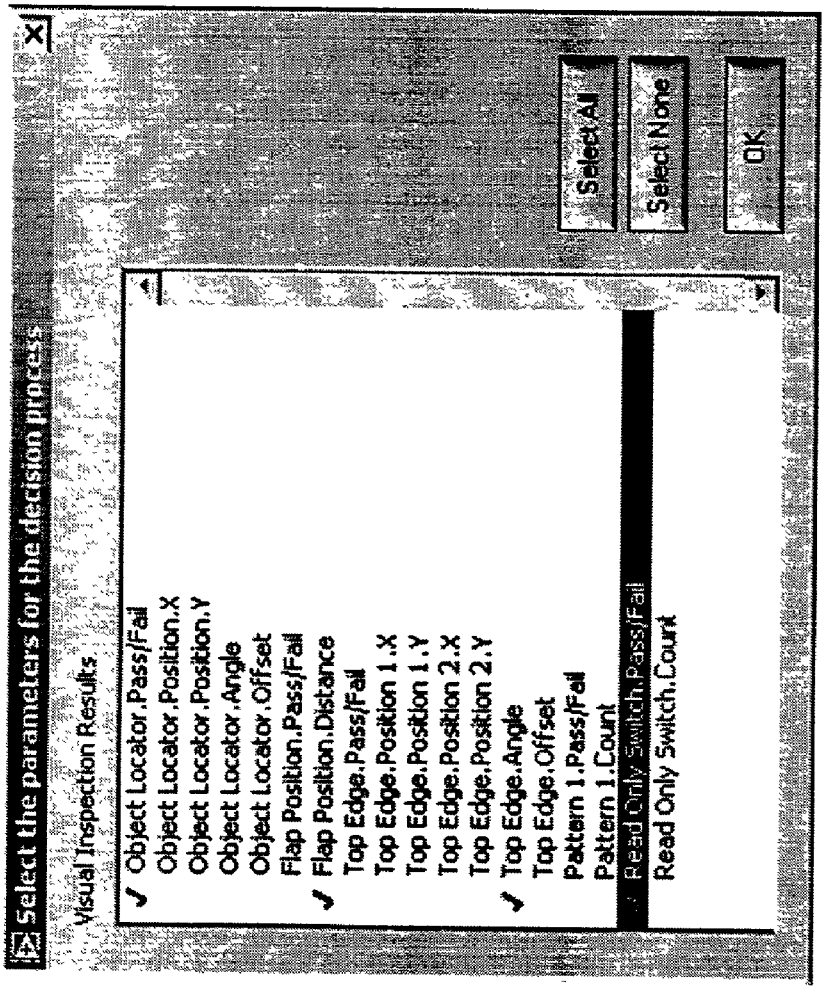
Figure 17:
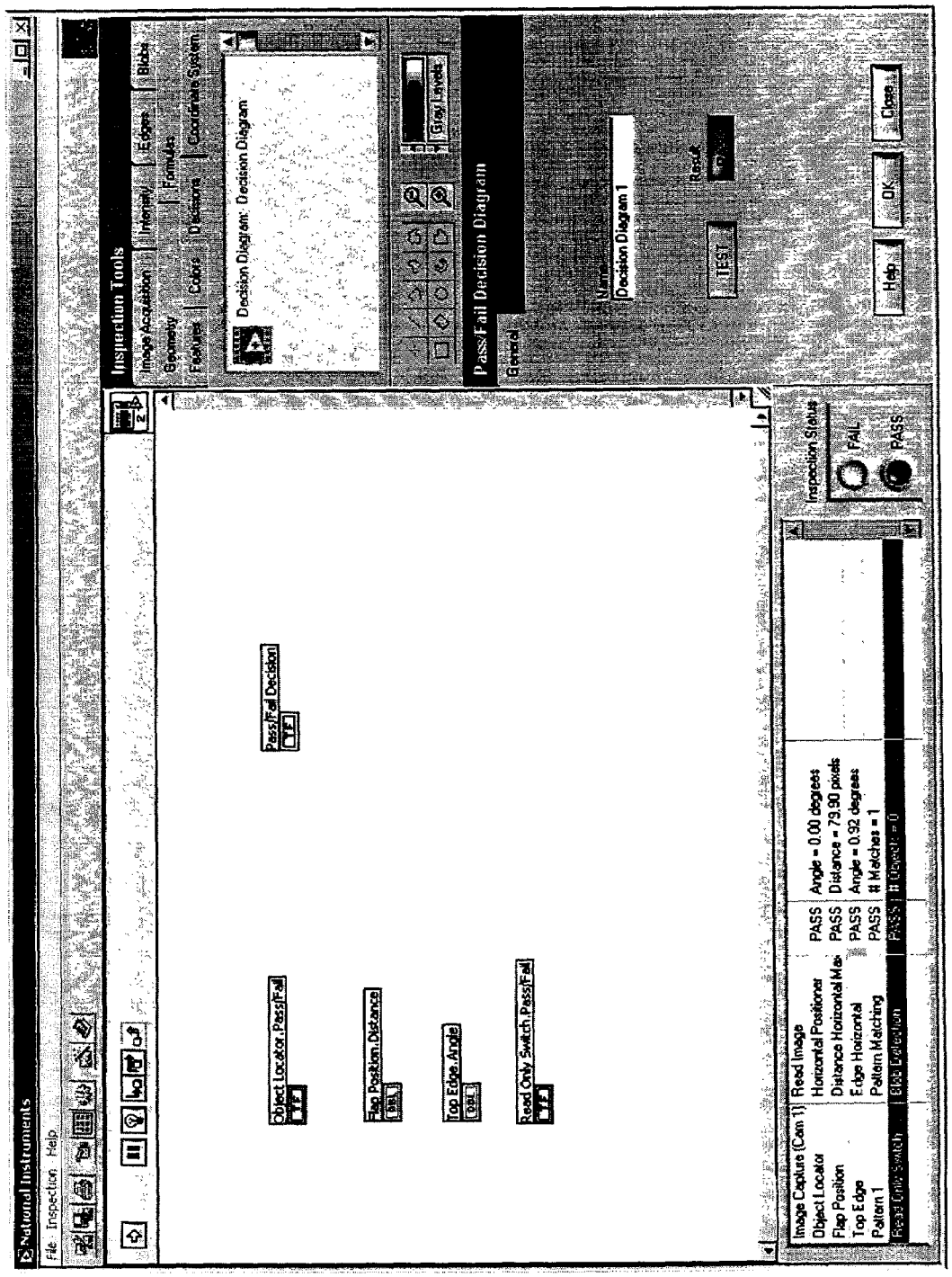

A diagram to specify a decision operation may then be created, based on one or more of the execution result values shown in the table of FIG. 15. FIG. 16 illustrates a selectable list of the execution result values shown in the table. The user may select which execution result values the decision operation should use. After selecting the desired items, a graphical user interface for creating a decision operation block diagram may be displayed, as shown in FIG. 17. As shown, nodes corresponding to the execution result values selected from the list of FIG. 16 may automatically be included in the block diagram. In this example, an additional node which receives a Boolean value indicating a Pass/Fail result for the decision operation is also automatically included in the block diagram.

Figure 18:
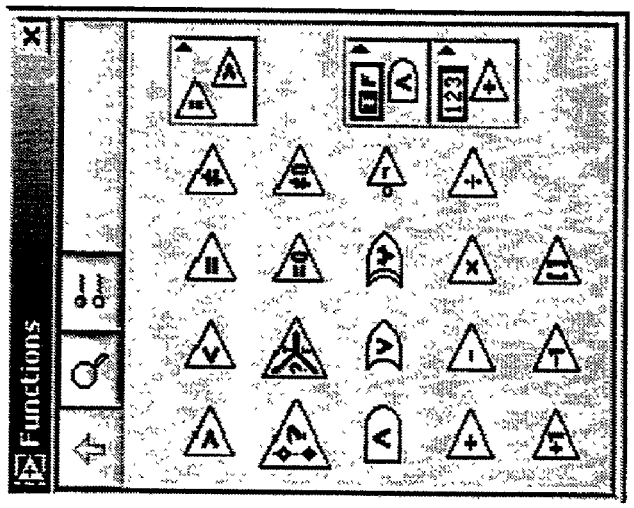
Figure 19:
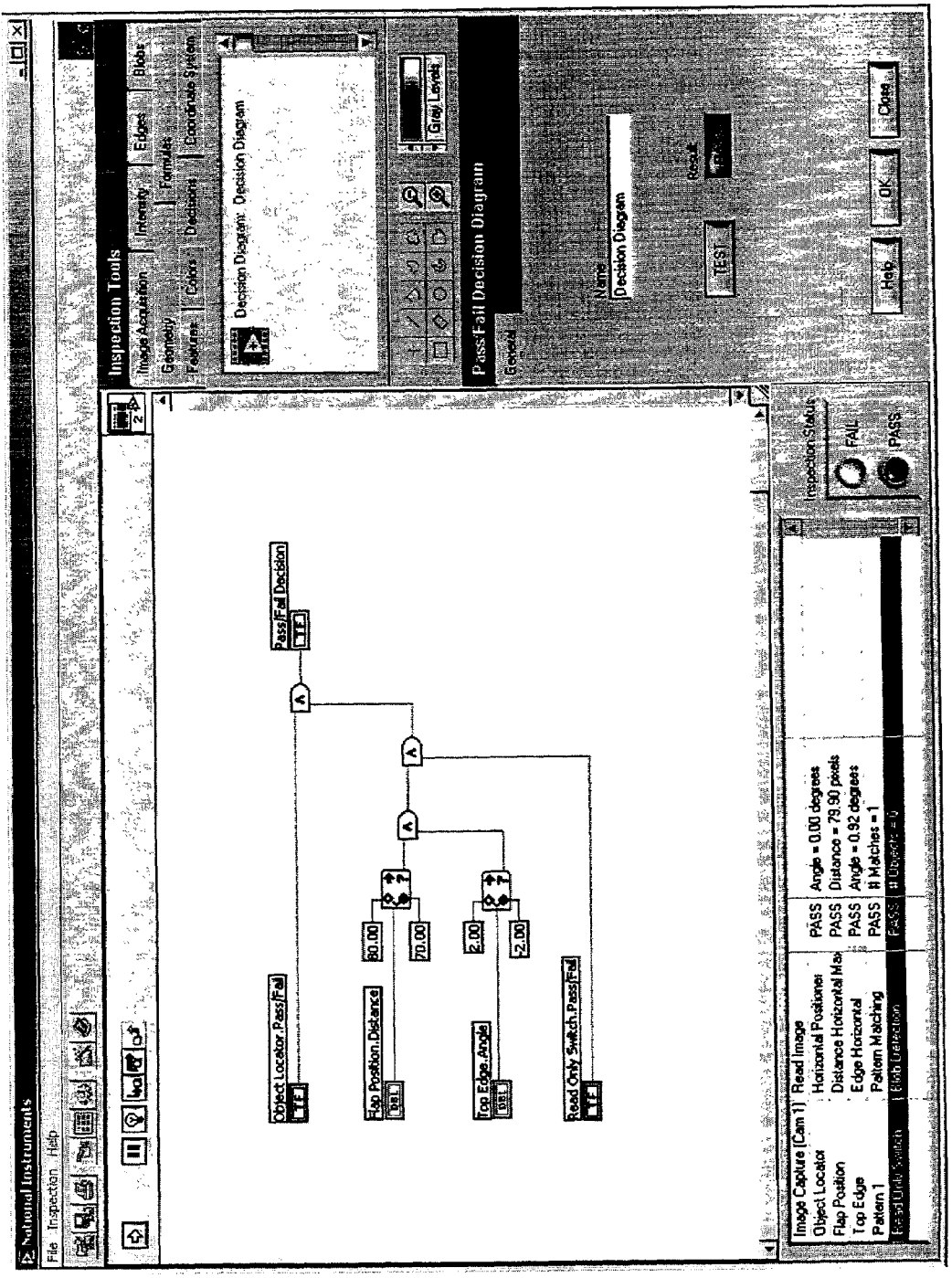
Figure 20:
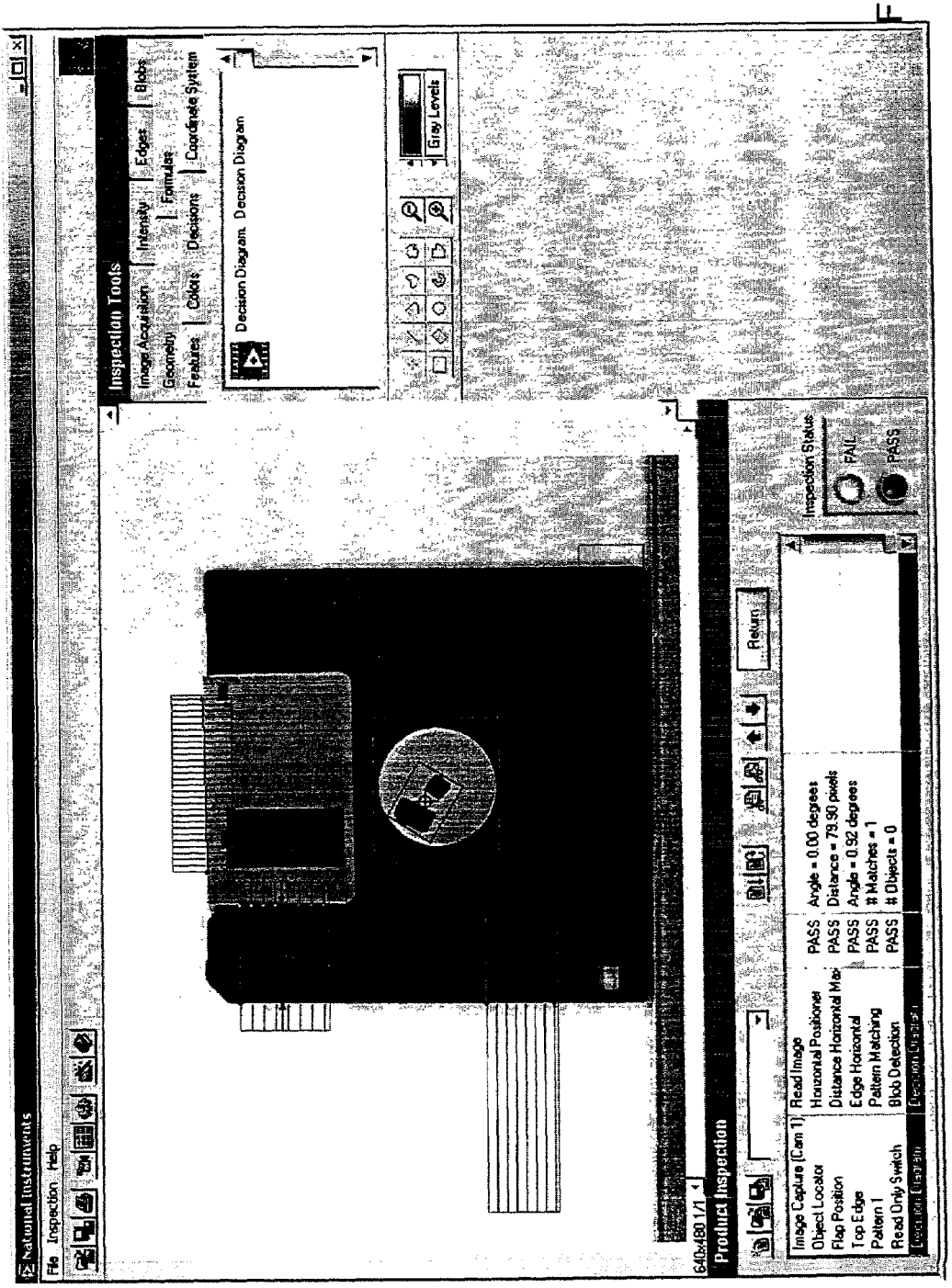

FIG. 18 illustrates a function palette from which the user may select various function nodes to include in the block diagram. The user may interconnect the block diagram nodes as desired to specify an appropriate decision operation. FIG. 19 illustrates an example of a completed block diagram defining a decision operation. As shown in FIG. 20, a decision step may then be added to the script, wherein the decision step is operable to perform the decision operation illustrated in FIG. 19 when executed.

Figure 21:
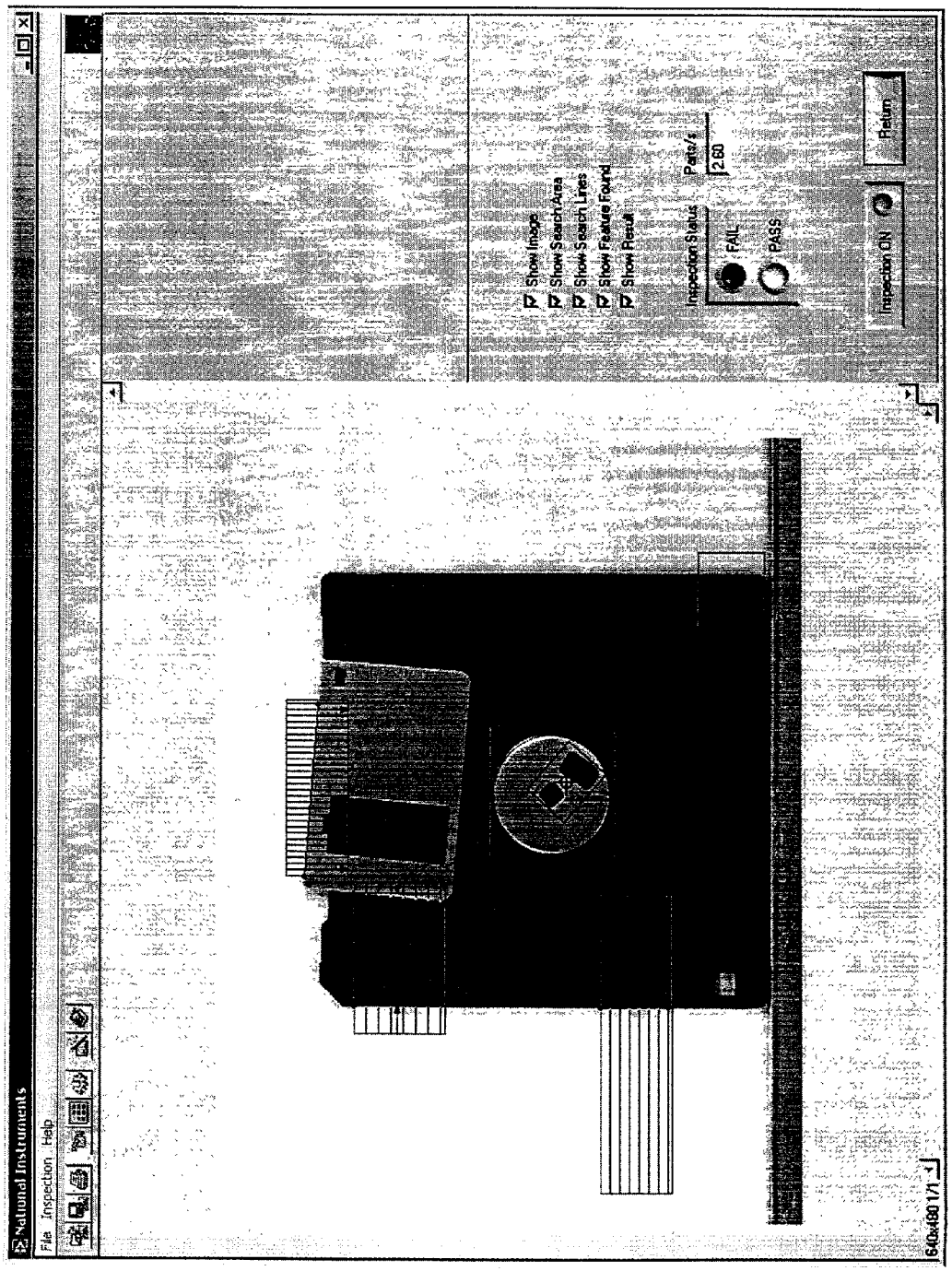

FIG. 21 illustrates runtime operation of the script. The "Inspection Status" area illustrates the Pass/Fail inspection result determined by the specified decision operation.

Alternative Embodiments

It is noted that FIGS. 8–21 illustrate one particular application of the methods described herein, and many alternative embodiments are contemplated. For example, the methods may be used to develop processes for many other fields besides machine vision and image processing. For example, it may be desirable to develop a process for a motion control application using different programming methodologies. One part of the motion control process may be specified by interacting with a three-dimensional model of a work area, e.g., to specify movements by a robotic device to be performed within the work area.

As another example, the methods may be used to specify a simulation process. The user may create a process specification comprising a set of simulation steps, e.g., by selecting the steps from various available operations using a graphical user interface or by specifying the steps using a text-based programming language. The user may then create a graphical portion that works in conjunction with the set of simulation steps. For example, the user may construct a block diagram graphically specifying a procedure that computes feedback values based on the execution results of the simulation steps. The feedback values determined by the block diagram may then be fed back to the simulation steps in a loop, such that the feedback values determine the operation of the simulation steps in the next iteration of the loop. In the field of process control, a similar approach may be taken in specifying a process control loop utilizing different programming methodologies.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for specifying a computer-implemented process, the method comprising:

displaying a graphical user interface comprising a plurality of possible steps that are useable in specifying at least a portion of a process;

receiving first user input selecting a plurality of steps specifying a first portion of the process;

storing the plurality of steps in a memory in response to the first user input; and creating a block diagram in response to second user input selecting a plurality of nodes and interconnecting at least two of the plurality of nodes, thereby specifying a plurality of interconnected nodes, wherein the block diagram specifies a second portion of the process, wherein the second portion of the process is distinct from the first portion of the process, wherein the block diagram is distinct from the plurality of steps, wherein the block diagram comprises the plurality of interconnected nodes, and wherein the plurality of interconnected nodes visually indicate operation of the second portion of the process;

wherein the process specification and the block diagram collectively specify the computer-implemented process.

2. The method of claim 1, wherein the block diagram graphically specifies a procedure that uses values determined by the first portion of the process to produce one or more results.

3. The method of claim 1,
wherein the block diagram graphically specifies a decision operation based on execution results determined by steps in the plurality of steps.

4. The method of claim 1, further comprising:
including one or more steps in the plurality of steps operable to perform a plurality of operations based on a result computed by the block diagram.

5. The method of claim 1, further comprising: including a step in the plurality of steps that references the block diagram.

6. The method of claim 1, further comprising:
executing the process, wherein said executing comprises executing the plurality of steps and executing the block diagram.

7. The method of claim 1, further comprising:
displaying a graphical user interface useable to create the block diagram;
wherein said receiving the second user input comprises receiving the second user input via the graphical user interface.

8. The method of claim 1, wherein said creating the block diagram comprises:
displaying the plurality of nodes in the block diagram, wherein one or more of the nodes are displayed in response to the second user input; and
creating an interconnection between the at least two of the plurality of nodes in response to the second user input.

9. The method of claim 1,
wherein said creating the block diagram in response to the second user input comprises creating a graphical program in response to the second user input.

10. The method of claim 1,
wherein the block diagram includes a first set of nodes having values determined by execution results of the plurality of steps; and
wherein said creating the block diagram comprises:
including a second set of function nodes in the block diagram in response to the second user input; and
connecting nodes from the first set of nodes to nodes from the second set of function nodes, in response to the second user input.

11. The method of claim 1, wherein each of the plurality of steps in the plurality of steps has one or more associated values; and
wherein the first user input specifies at least a subset of the values associated with the plurality of steps;
the method further comprising:
automatically including one or more nodes in the block diagram, wherein each node corresponds to a value from the specified at least a subset of values.

12. The method of claim 1,
wherein the graphical user interface indicates operations that can be performed on an object;
wherein the first user input specifies one or more operations on the object; and
wherein said storing the plurality of steps is performed in response to the first user input received via the graphical user interface specifying one or more operations to be performed on the object.

13. The method of claim 12, wherein the object is an image.

14. The method of claim 1, wherein the plurality of steps comprises a script.

15. The method of claim 1, wherein the plurality of steps is stored as a computer program.

16. The method of claim 1,
wherein the first user input specifies a plurality of code modules; and
wherein said storing the plurality of steps comprises including a reference to each specified code module in the plurality of steps.

17. The method of claim 1,
wherein said storing the plurality of steps in response to the first user input comprises creating a program portion coded in a text-based programming language in response to the first user input, and storing the program portion in the memory.

18. The method of claim 1,
wherein process is executable to inspect a device; and
wherein the block diagram is executable to determine an inspection classification for the device, depending on execution results of the plurality of steps.

19. The method of claim 1,
wherein the process is a machine vision process executable to visually inspect a device; and
wherein the block diagram is executable to determine an inspection classification for the device, depending on execution results of the plurality of steps.

20. The method of claim 1, wherein the process is executable to perform one or more of the following types of applications:
a machine vision application; an image processing application; an image analysis application; a motion control application; an industrial automation application; a process control application; a test and measurement application; a simulation application.

21. A method for specifying a computer-implemented process, the method comprising:
displaying a graphical user interface (GUI), wherein the GUI includes operations that are selectable to be included in a plurality of operations;
receiving user first input to the GUI, wherein the first user input selects operations for inclusion in the plurality of operations;
storing the plurality of operations in response to the first user input, wherein the plurality of operations specifies a first portion of the process; and
creating a block diagram in response to second user input to the GUI selecting a plurality of nodes and interconnecting at least two of the plurality of nodes, thereby specifying a plurality of interconnected nodes, wherein the block diagram specifies a second portion of the process, wherein the block diagram comprises the plurality of interconnected nodes, and wherein the plurality of interconnected nodes visually indicate operation of the second portion of the process;
wherein the plurality of operations is distinct from the block diagram; and
wherein the plurality of operations and the block diagram collectively specify the computer-implemented process.

22. The method of claim 21,
wherein the block diagram graphically specifies a procedure that uses values determined by the first portion of the process to produce one or more results.

23. The method of claim 21,
wherein the block diagram graphically specifies a decision operation based on execution results determined by steps in the plurality of operations.

24. The method of claim 21, further comprising:
including one or more steps in the plurality of operations operable to perform a plurality of operations based on a result computed by the block diagram.

25. A method for specifying a computer-implemented process, the method comprising:
receiving first user input indicating operations to be performed on an object;
storing a plurality of steps in a script in response to the first user input, wherein each step is operable to perform an operation; and
creating a block diagram in response to second user input, wherein the block diagram specifies a decision operation based on execution results of the plurality of steps, wherein the block diagram comprises a plurality of interconnected nodes which visually indicate the decision operation;
wherein the decision operation is distinct from the operations to be performed on the object, and wherein the block diagram is distinct from the script;
wherein the script and the diagram collectively specify the computer-implemented process.

26. The method of claim 25, further comprising:
receiving second user input specifying a first plurality of nodes;
wherein said creating the block diagram comprises creating the block diagram from the script, second user input, including the first plurality of nodes, and automatically including a second plurality of nodes, wherein each node of the second plurality of nodes is associated with a step of the plurality of steps in the script.

27. The method of claim 26, further comprising:
interconnecting at least one of the first plurality of nodes with at least one of the second plurality of nodes in response to third user input.

28. A method for specifying a computer-implemented process, the method comprising:
creating a plurality of steps in response to first user input, wherein the plurality of steps specify a first portion of the process;
creating a block diagram in response to second user input, wherein the block diagram specifies a second portion of the process;
wherein the block diagram comprises a plurality of interconnected nodes which visually indicate operation of the second portion of the process;
wherein the plurality of steps is distinct from the block diagram;
wherein the plurality of steps and the block diagram collectively specify the computer-implemented process.

29. A memory medium for specifying a computer-implemented process, the memory medium comprising program instructions executable to:
display a graphical user interface comprising a plurality of possible steps that are useable in specifying at least a portion of a process;
receive first user input selecting a plurality of steps specifying a first portion of the process;
store the plurality of steps in response to the first user input, wherein the plurality of steps specify a first portion of the process;
create a block diagram in response to second user input selecting a plurality of nodes and interconnecting at least two of the plurality of nodes, thereby specifying a plurality of interconnected nodes, wherein the block diagram specifies a second portion of the process;
wherein the block diagram comprises the plurality of interconnected nodes, and wherein the plurality of interconnected nodes visually indicate operation of the second portion of the process;
wherein the second portion of the process is distinct from the first portion of the process, and wherein the process specification is distinct from the block diagram; and
wherein the process specification and the block diagram collectively specify the computer-implemented process.

30. The memory medium of claim 29,
wherein the block diagram graphically specifies a procedure that uses values determined by the first portion of the process to produce one or more results.

31. The memory medium of claim 29,
wherein the block diagram graphically specifies a decision operation based on execution results determined by steps in the plurality of steps.

32. The memory medium of claim 29, wherein the program instructions are further executable to:
include one or more steps in the plurality of steps operable to perform a plurality of operations based on a result computed by the block diagram.

33. The memory medium of claim 29,
wherein, in said creating the block diagram, the program instructions are further executable to:
display a plurality of nodes in the diagram, wherein one or more of the nodes are displayed in response to the second user input;
create an interconnection between at least two of the plurality of nodes in response to the second user input.

34. The memory medium of claim 29,
wherein the graphical user interface indicates operations that can be performed on an object;
wherein the user input specifies one or more operations on the object; and
wherein the program instructions are further executable to perform said creating the plurality of steps in response to the first user input received via the graphical user interface specifying one or more operations to be performed on the object.

35. The memory medium of claim 34, wherein the object is an image.

36. The memory medium of claim 29,
wherein the process is a machine vision process executable to visually inspect a device;
wherein the block diagram is executable to determine an inspection classification for the device, depending on execution results of the plurality of steps.

37. A system for specifying a computer-implemented process, the system comprising:
a processor;
a memory storing program instructions;
wherein the processor is operable to execute the program instructions to:
display a graphical user interface comprising a plurality of possible steps that are useable in specifying at least a portion of a process;
receive first user input selecting a plurality of steps specifying a first portion of the process;
store the plurality of steps in response to the first user input; and create a block diagram in response to second user input selecting a plurality of nodes and interconnecting at least two of the plurality of nodes, thereby specifying a plurality of interconnected nodes, wherein the block diagram specifies a second portion of the process;

wherein the block diagram comprises the plurality of interconnected nodes, and wherein the plurality of interconnected nodes visually indicate operation of the second portion of the process;

wherein the first portion of the process is distinct from the second portion of the process, and wherein the plurality of steps is distinct from the block diagram; and wherein the plurality of steps and the block diagram collectively specify the computer-implemented process.

* * * * *